United States Patent
Wittmaak, Jr. et al.

(10) Patent No.: US 11,932,387 B2
(45) Date of Patent: Mar. 19, 2024

(54) ADAPTIVE TRANSITION SYSTEMS FOR VTOL AIRCRAFT

(71) Applicant: Textron Innovations Inc., Providence, RI (US)

(72) Inventors: John Robert Wittmaak, Jr., Newark, TX (US); Russell C. Peters, Fort Worth, TX (US); William Alexander Dean, Dallas, TX (US); Spencer Hancock, Irving, TX (US)

(73) Assignee: Textron Innovations Inc., Providence, RI (US)

( * ) Notice: Subject to any disclaimer, the term of this patent is extended or adjusted under 35 U.S.C. 154(b) by 231 days.

(21) Appl. No.: 17/540,539

(22) Filed: Dec. 2, 2021

(65) Prior Publication Data

US 2023/0174230 A1 Jun. 8, 2023

(51) Int. Cl.
*B64C 29/02* (2006.01)
*B64C 29/00* (2006.01)
(Continued)

(52) U.S. Cl.
CPC .......... *B64C 29/02* (2013.01); *B64C 29/0033* (2013.01); *G05D 1/0858* (2013.01);
(Continued)

(58) Field of Classification Search
CPC ..... B64C 25/06; B64C 29/0033; B64C 29/02; B64C 39/08; B64D 9/00; B64D 27/24;
(Continued)

(56) References Cited

U.S. PATENT DOCUMENTS 1,655,113 A 1/1928 Nikola
2,601,090 A 6/1952 James
(Continued)

FOREIGN PATENT DOCUMENTS

CN 105539833 A 5/2016
FR 2977865 A3 1/2013
(Continued)

OTHER PUBLICATIONS

Hochstenbach, Menno, et al. "Design and control of an unmanned aerial vehicle for autonomous parcel delivery with transition from vertical take-off to forward flight-vertikul, a quadcopter tailsitter." International Journal of Micro Air Vehicles 7.4 (2015): 395-405.*
(Continued)

*Primary Examiner* — Jason Holloway
*Assistant Examiner* — Blake A Wood
(74) *Attorney, Agent, or Firm* — Lawrence Youst PLLC

(57) ABSTRACT

A tailsitter aircraft includes an airframe, a thrust array attached to the airframe and a flight control system. The thrust array includes propulsion assemblies configured to transition the airframe from a forward flight orientation to a VTOL orientation at a conversion rate for an approach to a target ground location in a forward flight-to-VTOL transition phase. The flight control system implements an adaptive transition system including a transition parameter monitoring module configured to monitor parameters including a ground speed and a distance to the target ground location. The adaptive transition system includes a transition adjustment determination module configured to adjust the conversion rate of the airframe from the forward flight orientation to the VTOL orientation based on the ground speed and the distance to the target ground location such that the airframe is vertically aligned with the target ground location in the
(Continued)

VTOL orientation of the forward flight-to-VTOL transition phase.

18 Claims, 13 Drawing Sheets

(51) Int. Cl.
| | | |
|---|---|---|
| *B64C 39/08* | (2006.01) | |
| *B64D 9/00* | (2006.01) | |
| *B64U 10/20* | (2023.01) | |
| *B64U 30/10* | (2023.01) | |
| *B64U 101/60* | (2023.01) | |
| *G05D 1/00* | (2006.01) | |
| B64D 27/02 | (2006.01) | |
| B64D 27/24 | (2006.01) | |
| H01M 50/249 | (2021.01) | |

(52) U.S. Cl.
CPC .............. *G05D 1/102* (2013.01); *B64C 39/08* (2013.01); *B64D 9/00* (2013.01); *B64D 27/026* (2024.01); *B64D 27/24* (2013.01); *B64U 10/20* (2023.01); *B64U 30/10* (2023.01); *B64U 2101/60* (2023.01); *H01M 50/249* (2021.01); *H01M 2220/20* (2013.01)

(58) Field of Classification Search
CPC .. B64D 2027/026; B64U 10/20; B64U 30/10; B64U 50/19; B64U 50/32; B64U 60/50; B64U 70/40; B64U 70/80; B64U 2101/60; B64U 2101/64; G05D 1/0858; G05D 1/102; G05D 1/104; H01M 50/249; H01M 2220/20
See application file for complete search history.

(56) References Cited

U.S. PATENT DOCUMENTS

| | | |
|---|---|---|
| 2,655,997 A | 10/1953 | Peterson |
| 2,688,843 A | 9/1954 | Pitt |
| 3,002,712 A | 10/1961 | Sterling |
| 3,081,964 A | 3/1963 | Quenzler |
| 3,181,810 A | 5/1965 | Olson |
| 3,259,343 A | 7/1966 | Roppel |
| 3,289,980 A | 12/1966 | Gardner |
| 3,350,035 A | 10/1967 | Schlieben |
| 3,592,412 A | 7/1971 | Glatfelter |
| 3,618,875 A | 11/1971 | Kappus |
| 3,783,618 A | 1/1974 | Kawamura |
| 3,916,588 A | 11/1975 | Magill |
| 4,243,358 A | 1/1981 | Carlock et al. |
| 4,458,864 A | 7/1984 | Colombo et al. |
| 4,571,157 A | 2/1986 | Eickmann |
| 4,596,368 A | 6/1986 | Schmittle |
| 4,613,098 A | 9/1986 | Eickmann |
| 4,741,672 A | 5/1988 | Breuner |
| 4,771,967 A | 9/1988 | Geldbaugh |
| 4,913,377 A | 4/1990 | Eickmann |
| 4,925,131 A | 5/1990 | Eickmann |
| 5,131,605 A | 7/1992 | Kress |
| 5,188,512 A | 2/1993 | Thornton |
| 5,592,894 A | 1/1997 | Johnson |
| 5,842,667 A | 12/1998 | Jones |
| 6,086,015 A | 7/2000 | MacCready |
| 6,170,778 B1 | 1/2001 | Cycon et al. |
| 6,260,793 B1 | 7/2001 | Balayn et al. |
| 6,270,038 B1 | 8/2001 | Cycon et al. |
| 6,402,088 B1 | 6/2002 | Syrovy et al. |
| 6,655,631 B2 | 12/2003 | Austen-Brown |
| 6,845,939 B1 | 1/2005 | Baldwin |
| 6,886,776 B2 | 5/2005 | Wagner et al. |
| 6,892,980 B2 | 5/2005 | Kawai |
| 7,059,562 B2 | 6/2006 | Baldwin |
| 7,150,429 B2 | 12/2006 | Kusic |
| 7,210,654 B1 | 5/2007 | Cox et al. |
| 7,465,236 B2 | 12/2008 | Wagels |
| 7,472,863 B2 | 1/2009 | Pak |
| 7,555,893 B2 | 7/2009 | Okai et al. |
| 7,984,684 B2 | 7/2011 | Hinderks |
| 8,152,096 B2 | 4/2012 | Smith |
| 8,393,564 B2 | 3/2013 | Kroo |
| 8,505,846 B1 | 8/2013 | Sanders |
| 8,602,348 B2 | 12/2013 | Bryant |
| 8,646,720 B2 | 2/2014 | Shaw |
| 8,733,690 B2 | 5/2014 | Bevirt et al. |
| 8,800,912 B2 | 8/2014 | Oliver |
| 8,820,672 B2 | 9/2014 | Erben et al. |
| 8,833,692 B2 | 9/2014 | Yoeli |
| 8,909,391 B1 | 12/2014 | Peeters et al. |
| 8,948,935 B1 | 2/2015 | Peeters et al. |
| 9,022,312 B2 | 5/2015 | Kosheleff |
| 9,045,226 B2 | 6/2015 | Piasecki et al. |
| 9,087,451 B1 | 7/2015 | Jarrell |
| 9,108,744 B2 | 8/2015 | Takeuchi |
| 9,109,575 B2 | 8/2015 | Weddendorf et al. |
| 9,120,560 B1 | 9/2015 | Armer et al. |
| 9,127,908 B2 | 9/2015 | Miralles |
| 9,162,753 B1 | 10/2015 | Panto et al. |
| 9,187,174 B2 | 11/2015 | Shaw |
| 9,193,460 B2 | 11/2015 | Laudrain |
| 9,221,538 B2 | 12/2015 | Takahashi et al. |
| 9,242,714 B2 | 1/2016 | Wang et al. |
| 9,254,916 B2 | 2/2016 | Yang |
| 9,284,049 B1 | 3/2016 | Wang et al. |
| 9,321,530 B2 | 4/2016 | Wang et al. |
| 9,376,208 B1 | 6/2016 | Gentry |
| 9,388,794 B2 | 7/2016 | Weddendorf et al. |
| 9,403,593 B2 | 8/2016 | Downey et al. |
| 9,440,736 B2 | 9/2016 | Bitar |
| 9,463,875 B2 | 10/2016 | Abuelsaad et al. |
| 9,493,225 B2 | 11/2016 | Wang et al. |
| 9,610,817 B1 | 4/2017 | Piasecki et al. |
| 9,643,720 B2 | 5/2017 | Hesselbarth |
| 9,694,908 B2 | 7/2017 | Razroev |
| 9,694,911 B2 | 7/2017 | Bevirt et al. |
| 9,714,087 B2 | 7/2017 | Matsuda |
| 9,798,322 B2 | 10/2017 | Bachrach et al. |
| 9,800,091 B2 | 10/2017 | Nugent, Jr. et al. |
| 9,821,909 B2 | 11/2017 | Moshe |
| 9,963,228 B2 | 5/2018 | McCullough et al. |
| 9,994,313 B2 | 6/2018 | Claridge et al. |
| 10,011,351 B2 | 7/2018 | McCullough et al. |
| 10,124,890 B2 | 11/2018 | Sada-Salinas et al. |
| 10,183,746 B2 | 1/2019 | McCullough et al. |
| 10,214,285 B2 | 2/2019 | McCullough et al. |
| 10,220,944 B2 | 3/2019 | McCullough et al. |
| 10,227,133 B2 | 3/2019 | McCullough et al. |
| 10,232,950 B2 | 3/2019 | McCullough et al. |
| 10,301,016 B1 | 5/2019 | Bondarev et al. |
| 10,315,761 B2 | 6/2019 | McCullough et al. |
| 10,322,799 B2 | 6/2019 | McCullough et al. |
| 10,329,014 B2 | 6/2019 | McCullough et al. |
| 10,343,773 B1 | 7/2019 | McCullough et al. |
| 10,351,232 B2 | 7/2019 | McCullough et al. |
| 10,442,522 B2 | 10/2019 | Oldroyd et al. |
| 10,457,390 B2 | 10/2019 | McCullough et al. |
| 10,501,193 B2 | 12/2019 | Oldroyd et al. |
| 10,583,921 B1 | 3/2020 | McCullough et al. |
| 10,597,164 B2 | 3/2020 | Oldroyd et al. |
| 10,604,249 B2 | 3/2020 | McCullough et al. |
| 10,611,477 B1 | 4/2020 | McCullough et al. |
| 10,618,646 B2 | 4/2020 | McCullough et al. |
| 10,618,647 B2 | 4/2020 | McCullough et al. |
| 10,625,853 B2 | 4/2020 | McCullough et al. |
| 10,633,087 B2 | 4/2020 | McCullough et al. |
| 10,633,088 B2 | 4/2020 | Mccullough et al. |
| 10,661,892 B2 | 5/2020 | McCullough et al. |
| 10,737,765 B2 | 8/2020 | Oldroyd et al. |
| 10,737,778 B2 | 8/2020 | Oldroyd et al. |
| 10,752,350 B2 | 8/2020 | McCullough et al. |
| 10,870,487 B2 | 12/2020 | McCullough et al. |
| 10,913,541 B2 | 2/2021 | Oldroyd et al. |

(56) References Cited

U.S. PATENT DOCUMENTS

| | | | |
|---|---|---|---|
| 10,981,661 B2 | 4/2021 | Oldroyd et al. | |
| 11,027,837 B2 | 6/2021 | McCullough et al. | |
| 11,084,579 B2 | 8/2021 | Ivans et al. | |
| 11,091,257 B2 | 8/2021 | McCullough et al. | |
| 11,104,446 B2 | 8/2021 | McCullough et al. | |
| 11,440,678 B1 * | 9/2022 | Wiegman | B64D 45/04 |
| 11,613,380 B1 * | 3/2023 | Foland | G08G 5/0013 |
| | | | 701/3 |
| 11,679,867 B2 * | 6/2023 | Giroux | H04W 72/569 |
| | | | 701/3 |
| 2002/0100834 A1 | 8/2002 | Baldwin | |
| 2002/0100835 A1 | 8/2002 | Kusic | |
| 2003/0062443 A1 | 4/2003 | Wagner et al. | |
| 2004/0245374 A1 | 12/2004 | Morgan | |
| 2006/0091258 A1 | 5/2006 | Chiu et al. | |
| 2006/0266881 A1 | 11/2006 | Hughey | |
| 2007/0069065 A1 * | 3/2007 | Parks | G05D 1/0669 |
| | | | 244/7 B |
| 2007/0212224 A1 | 9/2007 | Podgurski | |
| 2007/0221780 A1 | 9/2007 | Builta | |
| 2009/0008499 A1 | 1/2009 | Shaw | |
| 2010/0147993 A1 | 6/2010 | Annati et al. | |
| 2010/0193644 A1 | 8/2010 | Karem | |
| 2010/0295321 A1 | 11/2010 | Bevirt | |
| 2011/0001001 A1 | 1/2011 | Bryant | |
| 2011/0042508 A1 | 2/2011 | Bevirt | |
| 2011/0042509 A1 | 2/2011 | Bevirt et al. | |
| 2011/0057453 A1 | 3/2011 | Roberts | |
| 2011/0121570 A1 | 5/2011 | Bevirt et al. | |
| 2011/0315806 A1 | 12/2011 | Piasecki et al. | |
| 2012/0091257 A1 * | 4/2012 | Wolff | B64C 39/024 |
| | | | 244/12.4 |
| 2012/0209456 A1 | 8/2012 | Harmon et al. | |
| 2012/0234968 A1 | 9/2012 | Smith | |
| 2013/0020429 A1 | 1/2013 | Kroo | |
| 2013/0175404 A1 | 7/2013 | Shefer | |
| 2013/0341458 A1 | 12/2013 | Sutton et al. | |
| 2014/0018979 A1 | 1/2014 | Goossen et al. | |
| 2014/0097290 A1 | 4/2014 | Leng | |
| 2014/0339372 A1 | 11/2014 | Dekel et al. | |
| 2015/0012154 A1 | 1/2015 | Senkel et al. | |
| 2015/0014475 A1 | 1/2015 | Taylor et al. | |
| 2015/0136897 A1 | 5/2015 | Seibel et al. | |
| 2015/0197335 A1 * | 7/2015 | Dekel | B64C 27/52 |
| | | | 701/5 |
| 2015/0284079 A1 | 10/2015 | Matsuda | |
| 2015/0285165 A1 | 10/2015 | Steinwandel et al. | |
| 2016/0068265 A1 | 3/2016 | Hoareau et al. | |
| 2016/0180717 A1 | 6/2016 | Ubhi et al. | |
| 2016/0214712 A1 | 7/2016 | Fisher et al. | |
| 2017/0008627 A1 | 1/2017 | Soto et al. | |
| 2017/0021924 A1 | 1/2017 | Kubik et al. | |
| 2017/0066531 A1 | 3/2017 | McAdoo | |
| 2017/0097644 A1 | 4/2017 | Fegely et al. | |
| 2017/0144746 A1 | 5/2017 | Schank et al. | |
| 2017/0158312 A1 | 6/2017 | Alber et al. | |
| 2017/0174342 A1 | 6/2017 | Huang | |
| 2017/0240274 A1 | 8/2017 | Regev | |
| 2017/0297699 A1 | 10/2017 | Alber et al. | |
| 2017/0320568 A1 * | 11/2017 | Hohenthal | B64C 29/02 |
| 2017/0327219 A1 | 11/2017 | Alber | |
| 2017/0334557 A1 | 11/2017 | Alber et al. | |
| 2018/0002011 A1 | 1/2018 | McCullough et al. | |
| 2018/0002012 A1 | 1/2018 | McCullough et al. | |
| 2018/0002013 A1 | 1/2018 | McCullough et al. | |
| 2018/0002014 A1 | 1/2018 | McCullough et al. | |
| 2018/0002015 A1 | 1/2018 | McCullough et al. | |
| 2018/0002016 A1 | 1/2018 | McCullough et al. | |
| 2018/0002026 A1 | 1/2018 | Oldroyd et al. | |
| 2018/0002027 A1 | 1/2018 | McCullough et al. | |
| 2018/0022467 A1 | 1/2018 | Alber | |
| 2018/0044011 A1 | 2/2018 | Reichert | |
| 2018/0244377 A1 | 8/2018 | Chan | |
| 2018/0244383 A1 | 8/2018 | Valente et al. | |
| 2018/0257761 A1 | 9/2018 | Oldroyd et al. | |
| 2018/0265193 A1 | 9/2018 | Gibboney et al. | |
| 2018/0273160 A1 | 9/2018 | Baldwin et al. | |
| 2018/0327092 A1 | 11/2018 | Deng et al. | |
| 2018/0362158 A1 | 12/2018 | Zhang et al. | |
| 2019/0031331 A1 | 1/2019 | McCullough et al. | |
| 2019/0031334 A1 | 1/2019 | McCullough et al. | |
| 2019/0031335 A1 | 1/2019 | McCullough et al. | |
| 2019/0031336 A1 | 1/2019 | McCullough et al. | |
| 2019/0031337 A1 | 1/2019 | McCullough et al. | |
| 2019/0031338 A1 | 1/2019 | McCullough et al. | |
| 2019/0031339 A1 | 1/2019 | McCullough et al. | |
| 2019/0031361 A1 | 1/2019 | McCullough et al. | |
| 2019/0039720 A1 * | 2/2019 | Worsham | G05D 1/0676 |
| 2019/0144108 A1 | 5/2019 | McCullough et al. | |
| 2019/0233099 A1 * | 8/2019 | Lindsey | G05D 1/0669 |
| 2019/0263516 A1 | 8/2019 | McCullough et al. | |
| 2019/0389573 A1 | 12/2019 | Kahou et al. | |
| 2022/0289376 A1 * | 9/2022 | Hayakawa | B64C 13/18 |
| 2022/0350348 A1 * | 11/2022 | Nunes | G05D 1/102 |
| 2023/0027342 A1 * | 1/2023 | Kojima | G05D 1/0684 |

FOREIGN PATENT DOCUMENTS

| | | | |
|---|---|---|---|
| GB | 587388 A | 4/1947 | |
| GB | 618475 A | 2/1949 | |
| GB | 654089 A | 6/1951 | |
| WO | 2001074659 A1 | 10/2001 | |
| WO | 2005039973 A2 | 5/2005 | |
| WO | WO-2010137016 A2 * | 12/2010 | B64C 27/22 |
| WO | 2014067563 A1 | 5/2014 | |
| WO | WO-2017042291 A1 * | 3/2017 | |

OTHER PUBLICATIONS

Lyu, Ximin, et al. "Simulation and flight experiments of a quadrotor tail-sitter vertical take-off and landing unmanned aerial vehicle with wide flight envelope." International Journal of Micro Air Vehicles 10.4 (2018): 303-317.*

Swarnkar, Swati, et al. "Biplane-quadrotor tail-sitter uav: Flight dynamics and control." Journal of Guidance, Control, and Dynamics 41.5 (2018): 1049-1067.*

Trollinger, Lauren, et al. "Halcyon—33rd Annual Helicopter Society International Student Design Competition—Final Proposal" ( 2016).*

Phillips, Brandyn, Vikram Hrishikeshavan, and Inderjit Chopra. "Design, Development, and Testing of Package Delivery Quadrotor Biplane Tail-Sitter." Journal of Aircraft 58.4 (2021): 834-846.*

Kubo, Daisuke, and Shinji Suzuki. "Tail-sitter vertical takeoff and landing unmanned aerial vehicle: transitional flight analysis." Journal of Aircraft 45.1 (2008): 292-297.*

Yang, Yunjie, et al. "Robust optimal transition maneuvers control for tail-sitter unmanned aerial vehicles." International Journal of Robust and Nonlinear Control 31.16 (2021): 8007-8029.*

Banazadeh, Afshin, and Neda Taymourtash. "Optimal control of an aerial tail sitter in transition flight phases." Journal of Aircraft 53.4 (2016): 914-921.*

Kubo, Daisuke. "Study on design and transitional flight of tail-sitting VTOL UAV." Proceedings of 25th Congress of ICAS. 2006.*

Phillips, Brandyn, et al. "Flight performance of a package delivery quadrotor biplane." 7th AHS Technical Meeting on VTOL Unmanned Aircraft Systems, Phoenix, AZ. 2017.*

Ducard, Guillaume JJ, and Mike Allenspach. "Review of designs and flight control techniques of hybrid and convertible VTOL UAVs. " Aerospace Science and Technology 118 (2021): 107035.*

Air Launched Unmanned Disaster Relief Delivery Vehicle, 33rd Annual AHS Student Design Competition, University of Maryland, Undated but admitted prior art.

Bell and NASA Partner for UAV Development; Transportup.com; Sep. 9, 2018.

Bell APT—Automatic Pod Transport; SUASNEWS.com; Dec. 6, 2017.

Bell Autonomous Pod Transport; MONCH.com; May 2, 2018.

(56) References Cited

OTHER PUBLICATIONS

Duffy, et al., The LIFT! Project—Modular, Electric Vertical Lift System with Ground Power Tether, AHS 71st Annual Forum, Virginia Beach, Virginia, May 2015.
Kang, et al., Gap and Stagger Effects on Biplanes with End Plates, 47th AIAA Aerospace Sciences Meeting Including The New Horizons Forum and Aerospace Exposition, Orlando, Florida, Jan. 2009.
Munk, General Biplane Theory, National Advisory Committee for Aeronautics, Unknown Date.
Wolfe, Frank; Bell Moving to Scale Up Antonymous Delivery Drones for US Military; Rotor & Wing International; Sep. 27, 2018.

* cited by examiner

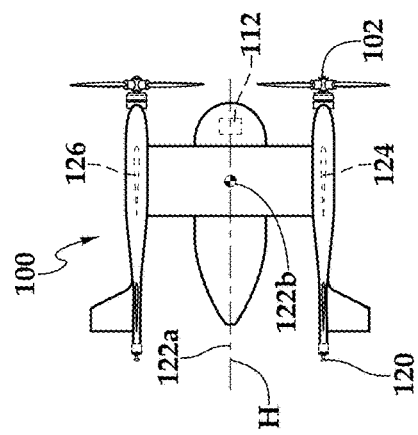
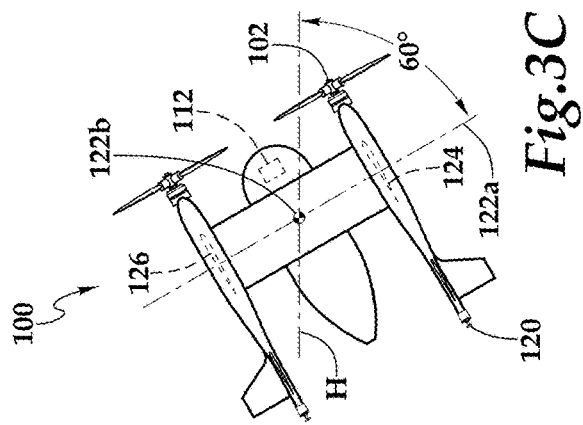
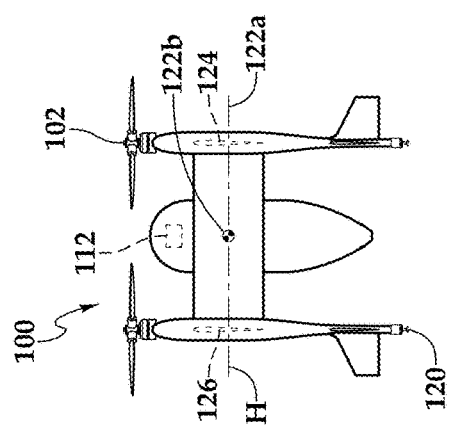
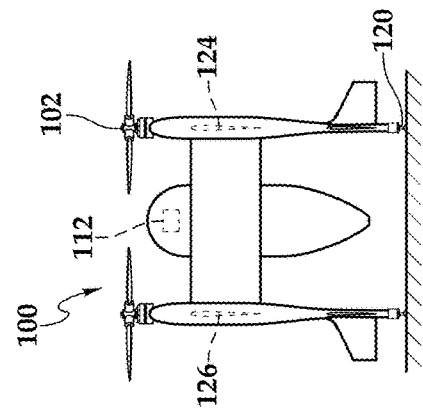

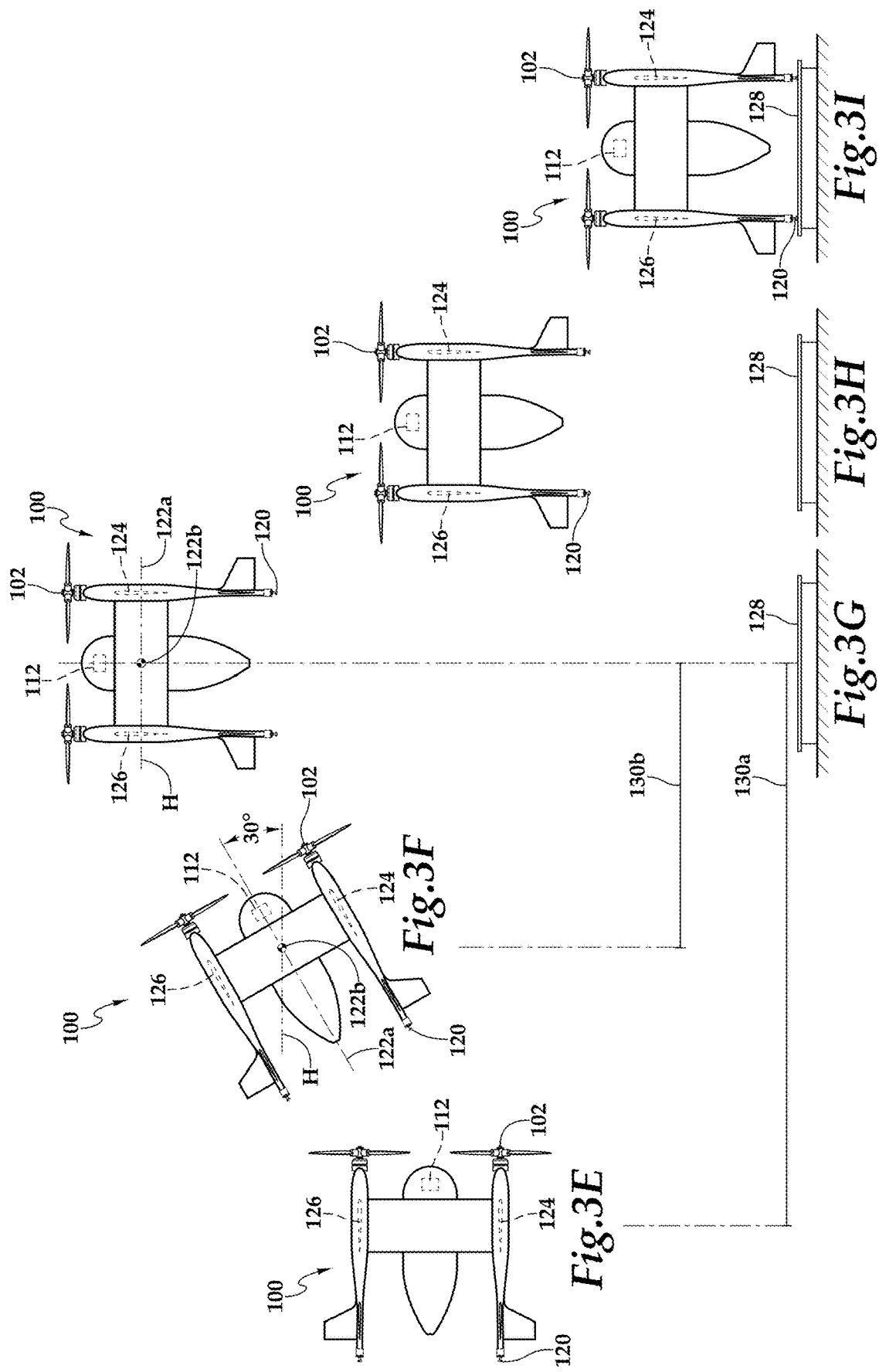

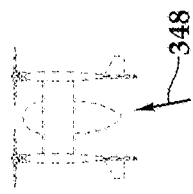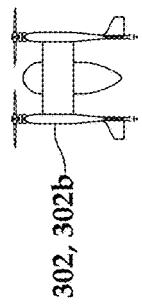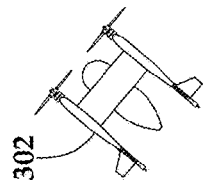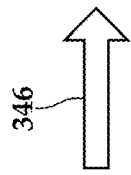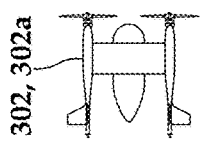

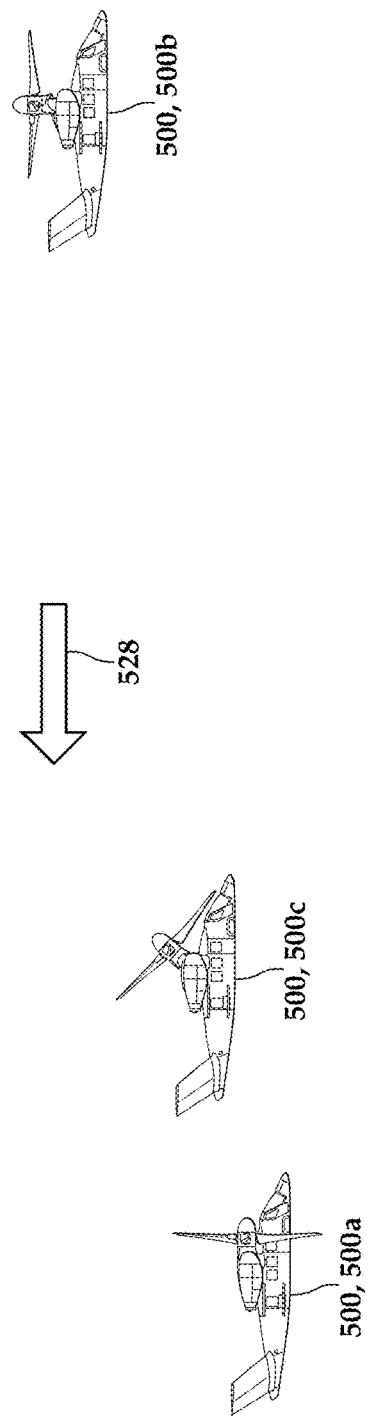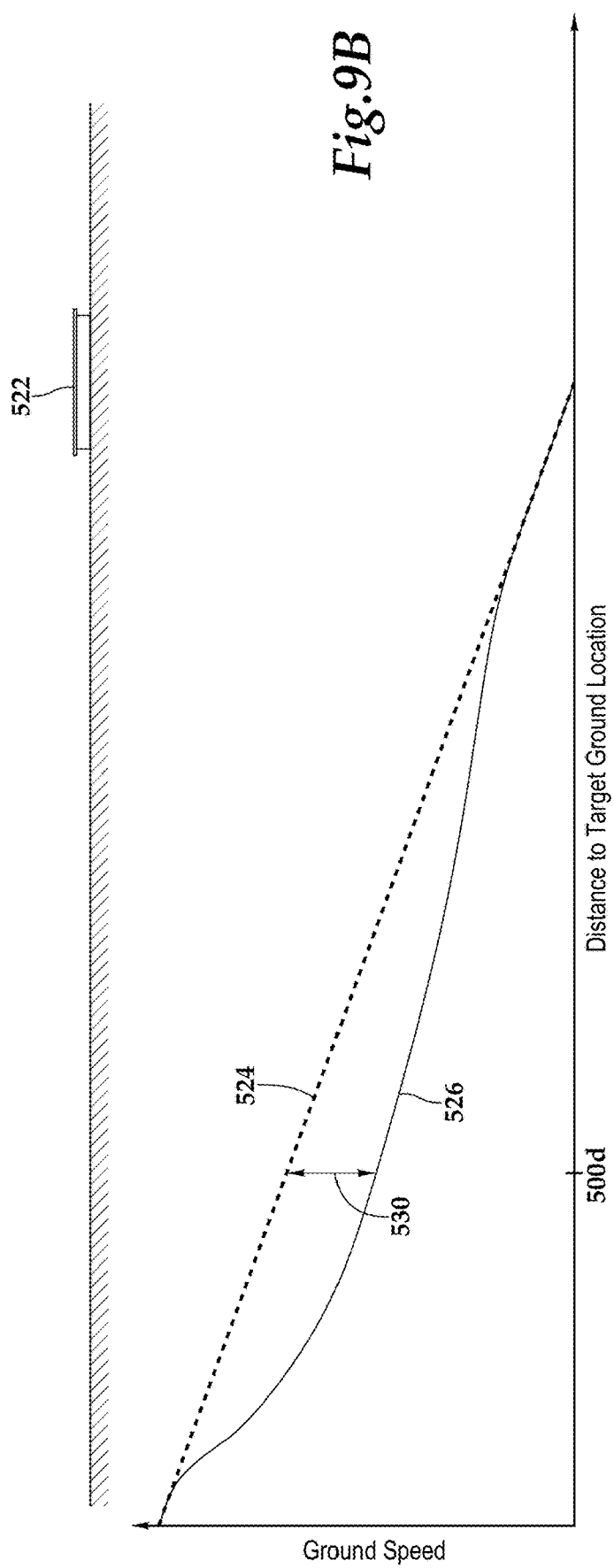

ADAPTIVE TRANSITION SYSTEMS FOR VTOL AIRCRAFT

TECHNICAL FIELD OF THE DISCLOSURE

The present disclosure relates, in general, to aircraft configured to transition from a forward flight orientation to a VTOL orientation and, in particular, to adaptive transition systems that improve the approach of a VTOL aircraft to a ground target location such that the VTOL aircraft is substantially vertically aligned with the target ground location following the transition.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section and generate a lifting force as the aircraft moves forward to support the aircraft in flight. Fixed-wing aircraft, however, typically require a runway that is hundreds or thousands of feet long for takeoff and landing. Unlike fixed-wing aircraft, vertical takeoff and landing (VTOL) aircraft do not require runways. Instead, VTOL aircraft are capable of taking off and landing vertically. Rotorcraft such as helicopters, tiltrotors, tiltwings, quadcopters, tailsitters and other multicopters are examples of VTOL aircraft. Each of these rotorcraft utilizes one or more rotors to provide lift and thrust to the aircraft. The rotors not only enable vertical takeoff and landing, but may also enable hover, forward flight, backward flight and lateral flight. These attributes make VTOL aircraft highly versatile for use in congested, isolated or remote areas.

Some types of VTOL aircraft such as tailsitters, tiltrotors and tiltwings are convertible between a forward flight orientation, in which the rotors provide forward thrust with the forward airspeed of the VTOL aircraft allowing for wing-borne lift enabling the VTOL aircraft to have a high forward speed, and a VTOL orientation, in which the rotors provide thrust-borne lift. When such VTOL aircraft approach a target ground location, such as a landing zone or payload drop zone, the VTOL aircraft undergoes a forward flight-to-VTOL transition phase in which the VTOL aircraft transitions from the forward flight orientation to the VTOL orientation. A primary goal of the forward flight-to-VTOL transition phase is to reach the VTOL orientation with zero ground speed when the VTOL aircraft is directly above the target ground location since hovering sideways to reach the target ground location after the forward flight-to-VTOL transition phase uses additional power that is best conserved for other operations. Indeed, hovering can often consume two times or more power than forward flight, severely reducing the overall range of the VTOL aircraft. Numerous factors affect the position of the VTOL aircraft as it transitions from the forward flight orientation to the VTOL orientation including air density, wind direction, wind speed and the inertia of the VTOL aircraft, which is affected by the payload and overall mass of the VTOL aircraft. Such factors can make it difficult to predict the final position of the VTOL aircraft at the end of the forward flight-to-VTOL transition phase.

In previous VTOL aircraft, the point at which the VTOL aircraft begins the forward flight-to-VTOL transition phase when approaching a target ground location has been estimated by a user based on ground-level winds and the payload of the VTOL aircraft. Upon beginning the forward flight-to-VTOL transition phase, the VTOL aircraft has a fixed conversion rate per a fixed transition schedule from the forward flight orientation to the VTOL orientation. Reliance on such a user estimate often results in overshooting or undershooting the target ground location, which in turn increases the VTOL aircraft's hover time and increases the likelihood of resorting to aggressive stopping maneuvers. Other previous implementations rely on airspeed to determine the point at which to begin the forward flight-to-VTOL transition phase. Airspeed measurements, however, can be unreliable or difficult to acquire on certain VTOL aircraft such as tailsitters. Accordingly, a need has arisen for transition systems that allow for a VTOL aircraft to reliably and predictably reach the VTOL orientation at the end of a forward flight-to-VTOL transition phase in a position vertically aligned with the target ground location by adapting to real-time conditions, thus conserving energy and reducing reliance on aggressive stopping maneuvers.

SUMMARY

In a first aspect, the present disclosure is directed to a tailsitter aircraft including an airframe, a thrust array attached to the airframe and a flight control system. The flight control system is configured to independently control a plurality of propulsion assemblies of the thrust array and to transition the airframe from a forward flight orientation for wing-borne lift to a VTOL orientation for thrust-borne lift at a conversion rate for an approach to a target ground location in a forward flight-to-VTOL transition phase. The flight control system implements an adaptive transition system including a transition parameter monitoring module configured to monitor parameters associated with the transition from the forward flight orientation to the VTOL orientation including a ground speed and a distance to the target ground location. The adaptive transition system further includes a transition adjustment determination module configured to adjust the conversion rate of the airframe from the forward flight orientation to the VTOL orientation based on the ground speed and the distance to the target ground location such that the airframe is substantially vertically aligned with the target ground location in the VTOL orientation of the forward flight-to-VTOL transition phase.

In some embodiments, the flight control system may include a predetermined transition schedule including a scheduled conversion rate and a scheduled ground speed for the airframe at various distances to the target ground location in the forward flight-to-VTOL transition phase. In such embodiments, the transition adjustment determination module may be configured to compare the ground speed of the airframe with the scheduled ground speed at the plurality of distances to the target ground location. In certain embodiments, the transition adjustment determination module may be configured to compare the ground speed of the airframe with the scheduled ground speed at the various distances to the target ground location to determine a ground speed error at each of the plurality of distances to the target ground location. In some embodiments, the transition adjustment determination module may be configured to adjust the conversion rate of the airframe from the forward flight orientation to the VTOL orientation in proportion to the ground speed error. In certain embodiments, the transition adjustment determination module may be configured to increase the conversion rate of the airframe from the forward flight orientation to the VTOL orientation in response to the ground speed exceeding the scheduled ground speed. In some embodiments, the transition adjustment determination module may be configured to decrease the conversion rate of the airframe from the forward flight orientation to the VTOL orientation in response to the scheduled ground speed exceeding the ground speed.

In certain embodiments, the predetermined transition schedule may be a fixed predetermined transition schedule including a fixed scheduled conversion rate throughout the forward flight-to-VTOL transition phase. In some embodiments, the target ground location may be a landing zone or a payload drop zone. In other embodiments, the transition adjustment determination module may be configured to adjust the conversion rate of the airframe from the forward flight orientation to the VTOL orientation such that the ground speed is approximately zero when the airframe is substantially vertically aligned with the target ground location in the VTOL orientation of the forward flight-to-VTOL transition phase. In certain embodiments, the tailsitter aircraft may include a positioning module including a global positioning satellite module configured to detect a position of the airframe. In such embodiments, the transition parameter monitoring module may determine the ground speed and the distance to the target ground location based at least partially on the position of the airframe detected by the positioning module.

In a second aspect, the present disclosure is directed to a method for managing a transition of a VTOL aircraft from a forward flight orientation to a VTOL orientation for an approach to a target ground location in a forward flight-to-VTOL transition phase. The method includes monitoring a ground speed of the VTOL aircraft and a distance to the target ground location, comparing the ground speed of the VTOL aircraft to a scheduled ground speed at the distance to the target ground location and modifying a conversion rate of the VTOL aircraft in the forward flight-to-VTOL transition phase based on the comparison between the ground speed of the VTOL aircraft and the scheduled ground speed.

In some embodiments, comparing the ground speed of the VTOL aircraft to the scheduled ground speed at the distance to the target ground location may include comparing the ground speed of the VTOL aircraft to the scheduled ground speed at a plurality of distances to the target ground location in the forward flight-to-VTOL transition phase. In certain embodiments, comparing the ground speed of the VTOL aircraft to the scheduled ground speed at the distance to the target ground location may include comparing the ground speed of the VTOL aircraft to the scheduled ground speed at the distance to the target ground location to determine a ground speed error at the distance to the target ground location. In some embodiments, modifying the conversion rate of the VTOL aircraft in the forward flight-to-VTOL transition phase based on the comparison between the ground speed of the VTOL aircraft and the scheduled ground speed may include modifying the conversion rate of the VTOL aircraft in the forward flight-to-VTOL transition phase in proportion to the ground speed error.

In certain embodiments, modifying the conversion rate of the VTOL aircraft in the forward flight-to-VTOL transition phase based on the comparison between the ground speed of the VTOL aircraft and the scheduled ground speed may include increasing the conversion rate of the VTOL aircraft from the forward flight orientation to the VTOL orientation in response to the ground speed exceeding the scheduled ground speed. In some embodiments, modifying the conversion rate of the VTOL aircraft in the forward flight-to-VTOL transition phase based on the comparison between the ground speed of the VTOL aircraft and the scheduled ground speed may include decreasing the conversion rate of the VTOL aircraft from the forward flight orientation to the VTOL orientation in response to the scheduled ground speed exceeding the ground speed. In certain embodiments, modifying the conversion rate of the VTOL aircraft in the forward flight-to-VTOL transition phase based on the comparison between the ground speed of the VTOL aircraft and the scheduled ground speed may include modifying the conversion rate of the VTOL aircraft in the forward flight-to-VTOL transition phase such that the VTOL aircraft is substantially vertically aligned with the target ground location in the VTOL orientation of the forward flight-to-VTOL transition phase.

In some embodiments, modifying the conversion rate of the VTOL aircraft in the forward flight-to-VTOL transition phase based on the comparison between the ground speed of the VTOL aircraft and the scheduled ground speed may include increasing the conversion rate of the VTOL aircraft from the forward flight orientation to the VTOL orientation in response to the VTOL aircraft experiencing a tail wind. In certain embodiments, modifying the conversion rate of the VTOL aircraft in the forward flight-to-VTOL transition phase based on the comparison between the ground speed of the VTOL aircraft and the scheduled ground speed may include decreasing the conversion rate of the VTOL aircraft from the forward flight orientation to the VTOL orientation in response to the VTOL aircraft experiencing a head wind. In some embodiments, the method may include receiving the target ground location from a remote system. In certain embodiments, the method may include limiting the conversion rate of the VTOL aircraft in the forward flight-to-VTOL transition phase from exceeding an upper conversion rate threshold.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which:

FIGS. 3A-3I are schematic illustrations of an aircraft having an adaptive transition system in a sequential flight operating scenario in accordance with embodiments of the present disclosure;

FIGS. 6A-6F are schematic illustrations of an aircraft having an adaptive transition system in various sequential flight operating scenarios with different wind conditions in accordance with embodiments of the present disclosure;

FIGS. 9A-9B are schematic illustrations of a tiltrotor aircraft having an adaptive transition system in a sequential flight operating scenario in accordance with embodiments of the present disclosure.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, all features of an actual implementation may not be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the devices described herein may be oriented in any desired direction. As used herein, the term "coupled" may include direct or indirect coupling by any means, including by mere contact or by moving and/or non-moving mechanical connections.

Figure 1A:
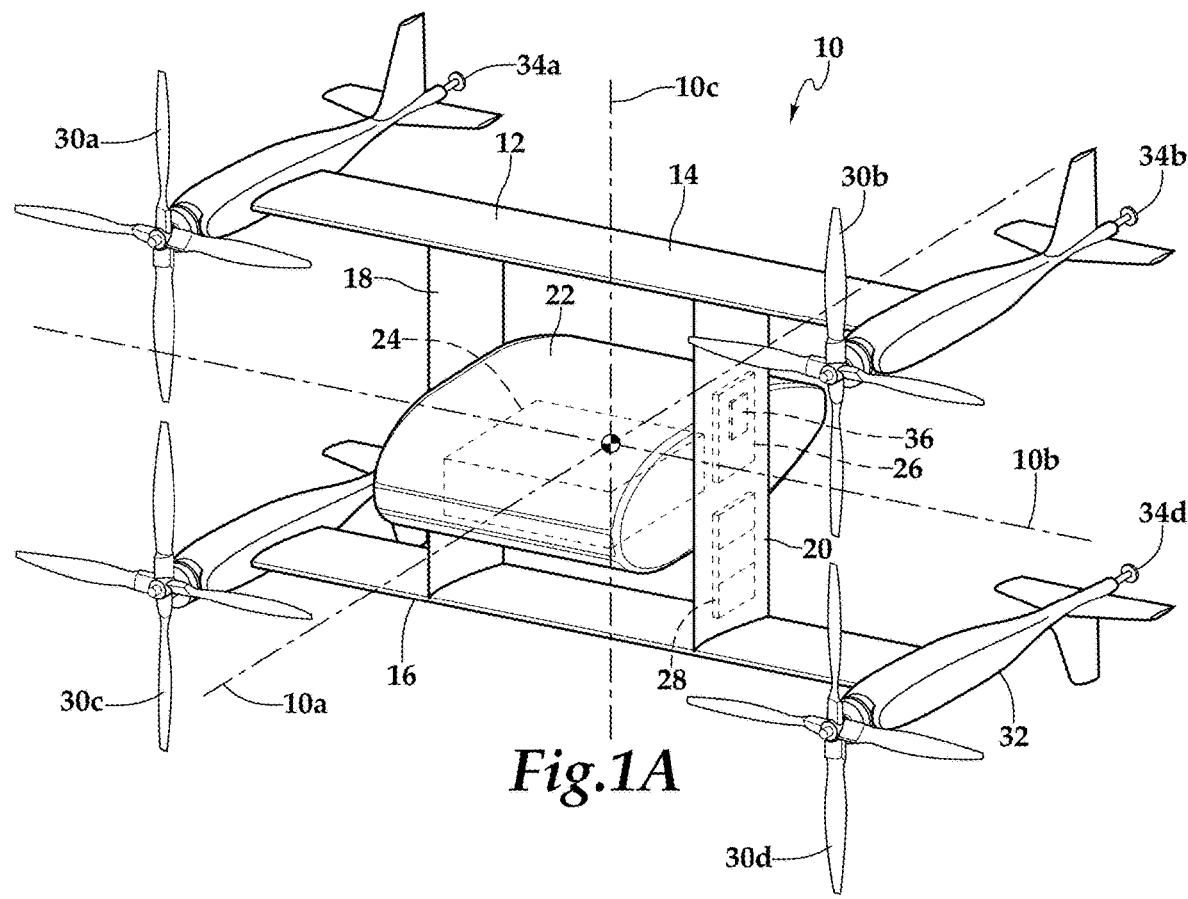
FIGS. 1A-1B are schematic illustrations of an aircraft having an adaptive transition system that is operable to convert between thrust-borne lift in a VTOL orientation and wing-borne lift in a biplane orientation in accordance with embodiments of the present disclosure.
Figure 1B:
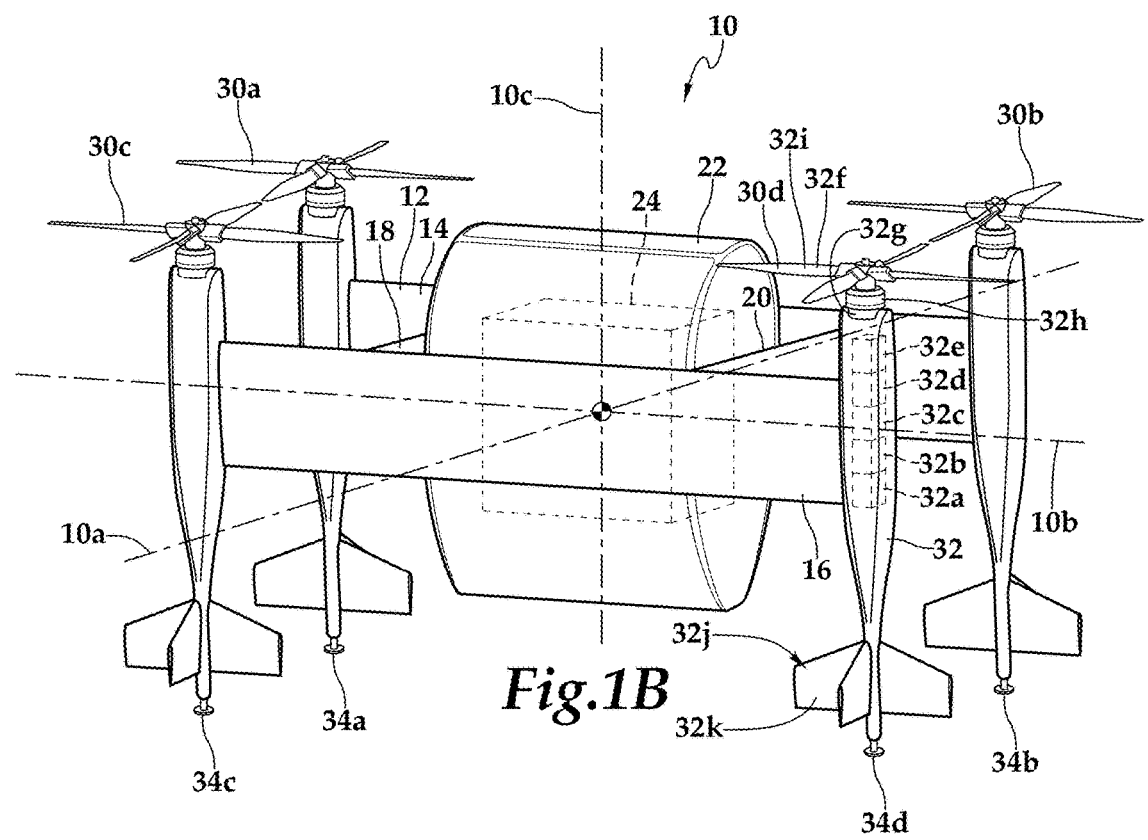

Referring to FIGS. 1A-1B in the drawings, isometric views of a tailsitter aircraft 10 having an adaptive transition system that is operable to transition between thrust-borne lift in a VTOL orientation and wing-borne lift in a biplane orientation are depicted. FIG. 1A depicts aircraft 10 in the biplane orientation wherein the propulsion assemblies provide forward thrust with the forward airspeed of aircraft 10 providing wing-borne lift enabling aircraft 10 to have a high speed and/or high endurance forward flight mode. FIG. 1B depicts aircraft 10 in the VTOL orientation wherein the propulsion assemblies provide thrust-borne lift. Aircraft 10 has a longitudinal axis 10a that may also be referred to as the roll axis, a lateral axis 10b that may also be referred to as the pitch axis and a vertical axis 10c that may also be referred to as the yaw axis. When longitudinal axis 10a and lateral axis 10b are both in a horizontal plane and normal to the local vertical in the earth's reference frame, aircraft 10 has a level flight attitude. In the illustrated embodiment, the length of aircraft 10 in the direction of lateral axis 10b is greater than the width of aircraft 10 in the direction of longitudinal axis 10a in the VTOL orientation of aircraft 10, as depicted in FIG. 1B. Both the magnitudes of the length and the width of aircraft 10 as well as the difference between the length and the width of aircraft 10 are important relative to the landing stability of aircraft 10 as well as the tip-over stability of aircraft 10 when aircraft 10 is positioned on a surface such as the ground in a tailsitter orientation.

In the illustrated embodiment, aircraft 10 has an airframe 12 including wings 14, 16 each having an airfoil cross-section that generates lift responsive to the forward airspeed of aircraft 10. Wings 14, 16 may be formed as single members or may be formed from multiple wing sections. The outer skins for wings 14, 16 are preferably formed from high strength and lightweight materials such as fiberglass, carbon, plastic, metal or other suitable material or combination of materials. In the biplane orientation of aircraft 10, wing 14 is an upper wing having a straight wing configuration and wing 16 is a lower wing having a straight wing configuration. In other embodiments, wings 14, 16 could have other designs such as anhedral and/or dihedral wing designs, swept wing designs or other suitable wing designs. In the illustrated embodiment, wings 14, 16 are substantially parallel with each other. Extending generally perpendicularly between wings 14, 16 are two truss structures depicted as pylons 18, 20. In other embodiments, more than two pylons may be present. Pylons 18, 20 are preferably formed from high strength and lightweight materials such as fiberglass, carbon, plastic, metal or other suitable material or combination of materials. In the illustrated embodiment, pylons 18, 20 are substantially parallel with each other.

Aircraft 10 includes a cargo pod 22 that is coupled between pylons 18, 20. Cargo pod 22 may be fixably or removably coupled to pylons 18, 20. In addition, in the coupled position, cargo pod 22 may be fixed, shiftable or rotatable relative to pylons 18, 20. Cargo pod 22 has an aerodynamic shape configured to minimize drag during high speed forward flight. Cargo pod 22 is preferably formed from high strength and lightweight materials such as fiberglass, carbon, plastic, metal or other suitable material or combination of materials. Cargo pod 22 has an interior region that may receive a payload 24 therein such as one or more packages. Aircraft 10 may autonomously transport and deliver payload 24 to a desired location, in which case aircraft 10 may be referred to as an unmanned aerial vehicle (UAV), an unmanned aerial system (UAS) or a drone. In other embodiments, aircraft 10 may not include cargo pod 22.

One or more of cargo pod 22, wings 14, 16 and/or pylons 18, 20 may contain flight control systems, energy sources, communication lines and other desired systems. For example, pylon 20 houses flight control system 26 of aircraft 10. Flight control system 26 is preferably a redundant digital flight control system including multiple independent flight control computers. For example, the use of a triply redundant flight control system 26 improves the overall safety and reliability of aircraft 10 in the event of a failure in flight control system 26. Flight control system 26 preferably includes non-transitory computer readable storage media including a set of computer instructions executable by one or more processors for controlling the operation of aircraft 10. Flight control system 26 may be implemented on one or more general-purpose computers, special purpose computers or other machines with memory and processing capability. For example, flight control system 26 may include one or more memory storage modules including, but not limited to, internal storage memory such as random access memory, non-volatile memory such as read only memory, removable memory such as magnetic storage memory, optical storage, solid-state storage memory or other suitable memory storage entities. Flight control system 26 may be a microprocessor-based system operable to execute program code in the form of machine-executable instructions. In addition, flight control system 26 may be selectively connectable to other computer systems via a proprietary encrypted network, a public encrypted network, the Internet or other suitable communication network that may include both wired and wireless connections.

One or more of cargo pod 22, wings 14, 16 and/or pylons 18, 20 may contain one or more electrical power sources depicted as a plurality of batteries 28 in pylon 20. Batteries 28 supply electrical power to flight control system 26, the distributed thrust array of aircraft 10 and/or other power consumers of aircraft 10 such that aircraft 10 may be referred to as an electric vertical takeoff and landing (eVTOL) aircraft. In other embodiments, aircraft 10 may have a hybrid power system that includes one or more internal combustion engines and an electric generator. Preferably, the electric generator is used to charge batteries 28. In other embodiments, the electric generator may provide power directly to a power management system and/or the power consumers of aircraft 10. In still other embodiments, aircraft 10 may use fuel cells as the electrical power source.

Cargo pod 22, wings 14, 16 and/or pylons 18, 20 also contain a wired and/or wireless communication network that enables flight control system 26 to communicate with the distributed thrust array of aircraft 10. In the illustrated embodiment, aircraft 10 has a two-dimensional distributed thrust array that is coupled to airframe 12. As used herein, the term "two-dimensional thrust array" refers to a plurality of thrust generating elements that occupy a two-dimensional space in the form of a plane. A minimum of three thrust generating elements is required to form a "two-dimensional thrust array." A single aircraft may have more than one "two-dimensional thrust array" if multiple groups of at least three thrust generating elements each occupy separate two-dimensional spaces thus forming separate planes. As used herein, the term "distributed thrust array" refers to the use of multiple thrust generating elements each producing a portion of the total thrust output. The use of a "distributed thrust array" provides redundancy to the thrust generation capabilities of the aircraft including fault tolerance in the event of the loss of one of the thrust generating elements. A "distributed thrust array" can be used in conjunction with a "distributed power system" in which power to each of the thrust generating elements is supplied by a local power system instead of a centralized power source. For example, in a "distributed thrust array" having a plurality of propulsion assemblies acting as the thrust generating elements, a "distributed power system" may include individual battery elements housed within the nacelle of each propulsion assembly.

The two-dimensional distributed thrust array of aircraft 10 includes a plurality of propulsion assemblies, individually denoted as 30a, 30b, 30c, 30d and collectively referred to as propulsion assemblies 30. In the illustrated embodiment, propulsion assemblies 30a, 30b are coupled at the wingtips of wing 14 and propulsion assemblies 30c, 30d are coupled at the wingtips of wing 16. By positioning propulsion assemblies 30a, 30b, 30c, 30d at the wingtips of wings 14, 16, the thrust and torque generating elements are positioned at the maximum outboard distance from the center of gravity of aircraft 10 located, for example, at the intersection of axes 10a, 10b, 10c. The outboard locations of propulsion assemblies 30 provide dynamic stability to aircraft 10 in hover and a high dynamic response in the VTOL orientation of aircraft 10 enabling efficient and effective pitch, yaw and roll control by changing the thrust, thrust vector and/or torque output of certain propulsion assemblies 30 relative to other propulsion assemblies 30.

Even though the illustrated embodiment depicts four propulsion assemblies, the distributed thrust array of aircraft 10 could have other numbers of propulsion assemblies both greater than or less than four. Also, even though the illustrated embodiment depicts propulsion assemblies 30 in a wingtip mounted configuration, the distributed thrust array of aircraft 10 could have propulsion assemblies coupled to the wings and/or pylons in other configurations such as mid-span configurations. Further, even though the illustrated embodiment depicts propulsion assemblies 30 in a mid-wing configuration, the distributed thrust array of aircraft 10 could have propulsion assemblies coupled to the wings in a low wing configuration, a high wing configuration or any combination or permutation thereof. In the illustrated embodiment, propulsion assemblies 30 are variable speed propulsion assemblies having fixed pitch rotor blades and thrust vectoring capability. Depending upon the implementation, propulsion assemblies 30 may have longitudinal thrust vectoring capability, lateral thrust vectoring capability or omnidirectional thrust vectoring capability. In other embodiments, propulsion assemblies 30 may operate as single speed propulsion assemblies, may have variable pitch rotor blades and/or may be non-thrust vectoring propulsion assemblies.

Propulsion assemblies 30 may be independently attachable to and detachable from airframe 12 and may be standardized and/or interchangeable units and preferably line replaceable units (LRUs) providing easy installation and removal from airframe 12. The use of line replaceable propulsion units is beneficial in maintenance situations if a fault is discovered with one of the propulsion assemblies. In this case, the faulty propulsion assembly 30 can be decoupled from airframe 12 by simple operations and another propulsion assembly 30 can then be attached to airframe 12. In other embodiments, propulsion assemblies 30 may be permanently coupled to wings 14, 16.

Referring to FIG. 1B, component parts of propulsion assembly 30d will now be described. It is noted that propulsion assembly 30d is representative of each propulsion assembly 30 therefore, for sake of efficiency, certain features have been disclosed only with reference to propulsion assembly 30d. One having ordinary skill in the art, however, will fully appreciate an understanding of each propulsion assembly 30 based upon the disclosure herein of propulsion assembly 30d. In the illustrated embodiment, propulsion assembly 30d includes a nacelle 32 that houses components including a battery 32a, an electronic speed controller 32b, one or more actuators 32c, an electronics node 32d, one or more sensors 32e and other desired electronic equipment. Nacelle 32 also supports a propulsion system 32f including a gimbal 32g, a variable speed electric motor 32h and a rotor assembly 32i. Extending from a lower end of nacelle 32 is a tail assembly 32j that includes one or more aerosurfaces 32k. In the illustrated embodiment, aerosurfaces 32k include stationary horizontal and vertical stabilizers. In other embodiments, aerosurfaces 32k may be active aerosurfaces that serve as elevators to control the pitch or angle of attack of wings 14, 16 and/or ailerons to control the roll or bank of aircraft 10 in the biplane orientation of aircraft 10. Aerosurfaces 32k also serve to enhance hover stability in the VTOL orientation of aircraft 10.

Flight control system 26 communicates via a wired communications network within airframe 12 with electronics nodes 32d of propulsion assemblies 30. Flight control system 26 receives sensor data from sensors 32e and sends flight command information to the electronics nodes 32d such that each propulsion assembly 30 may be individually and independently controlled and operated. For example, flight control system 26 is operable to individually and independently control the speed and the thrust vector of each propulsion system 32f. Flight control system 26 may autonomously control some or all aspects of flight operation for aircraft 10. Flight control system 26 is also operable to communicate with remote systems, such as a ground station via a wireless communications protocol. The remote system may be operable to receive flight data from and provide commands or target ground locations to flight control system 26 to enable remote flight control over some or all aspects of flight operation for aircraft 10.

Aircraft 10 has a landing gear assembly 34 that includes a plurality of landing feet depicted as landing foot 34a coupled to a lower or aft end of propulsion assembly 30a, landing foot 34b coupled to a lower or aft end of propulsion assembly 30b, landing foot 34c coupled to a lower or aft end of propulsion assembly 30c and landing foot 34d coupled to a lower or aft end of propulsion assembly 30d. By positioning landing feet 34a, 34b, 34c, 34d at the lower end of wingtip mounted propulsion assemblies 30, landing feet 34a, 34b, 34c, 34d are positioned at the maximum outboard distance from the center of gravity of aircraft 10 located, for example, at the intersection of axes 10a, 10b, 10c, which provides for maximum landing stability and tip-over stability for aircraft 10.

As aircraft 10 approaches a target ground location such as a landing zone, waypoint or payload drop zone, aircraft 10 converts from the forward flight orientation shown in FIG. 1A to the VTOL orientation shown in FIG. 1B at a conversion rate. Flight control system 26 implements an adaptive transition system 36 that adjusts the conversion rate of aircraft 10 including airframe 12 in the transition from the forward flight orientation to the VTOL orientation based on a number of aircraft parameters such as ground speed and distance to the target ground location. Such real-time adjustment of the conversion rate during the approach toward the target ground location enables aircraft 10 to be substantially vertically aligned with the target ground location when aircraft 10 reaches the VTOL orientation.

It should be appreciated that aircraft 10 is merely illustrative of a variety of aircraft that can implement the embodiments disclosed herein. Indeed, adaptive transition system 36 may be implemented on any aircraft. Other aircraft implementations can include hybrid aircraft, tiltwing aircraft, tiltrotor aircraft, quad tiltrotor aircraft, gyrocopters, certain propeller-driven airplanes and the like. As such, those skilled in the art will recognize that adaptive transition system 36 can be integrated into a variety of aircraft configurations. It should be appreciated that even though aircraft are particularly well-suited to implement the embodiments of the present disclosure, non-aircraft vehicles and devices can also implement the embodiments.

Figure 2:
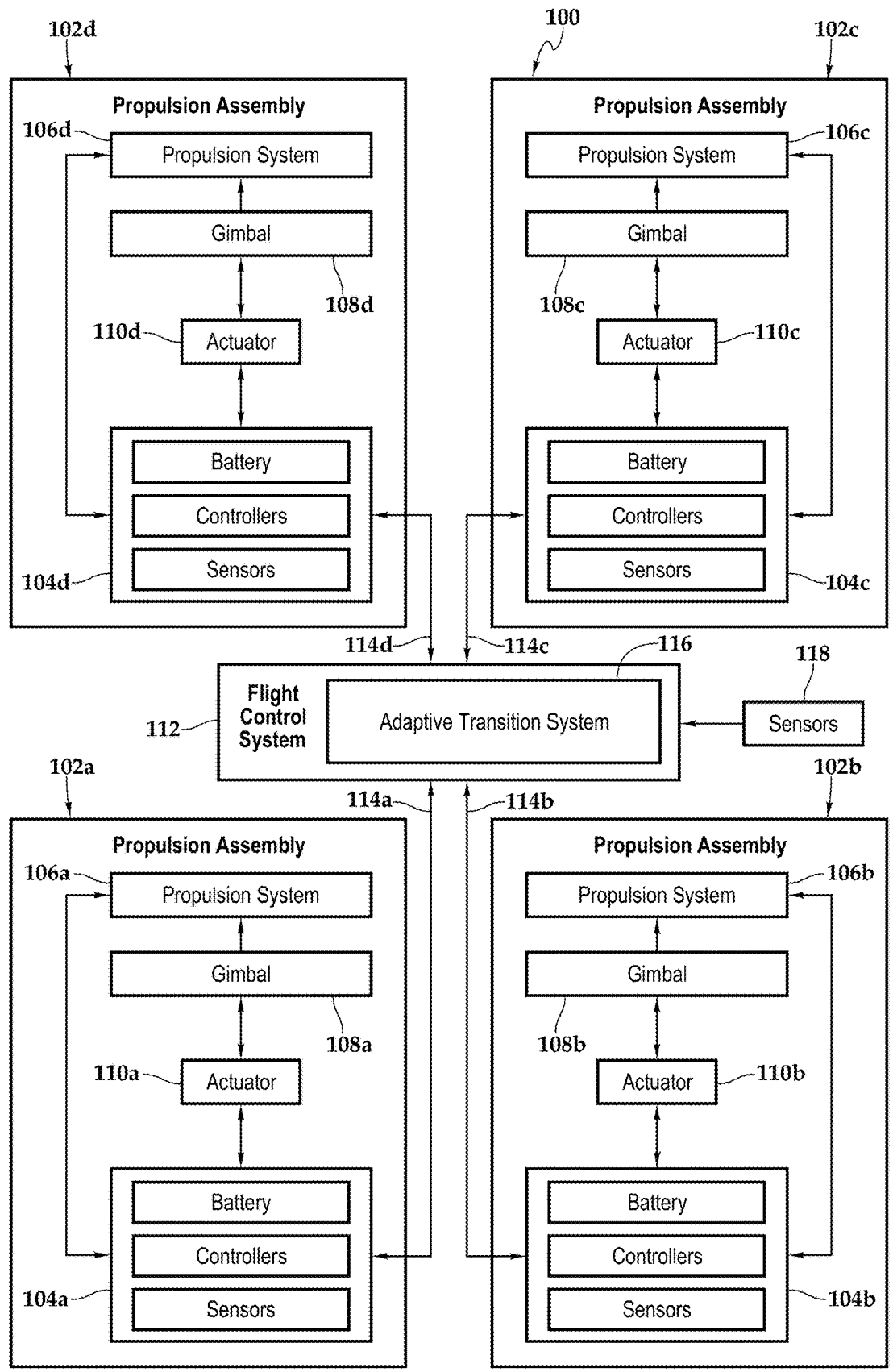
FIG. 2 is a block diagram of one implementation of a plurality of propulsion assemblies and a flight control system for an aircraft having an adaptive transition system in accordance with embodiments of the present disclosure.

Referring next to FIG. 2, a block diagram illustrates one implementation of a propulsion and flight control system for an aircraft 100 that is representative of aircraft 10 discussed herein. Specifically, aircraft 100 includes four propulsion assemblies 102a, 102b, 102c, 102d that form a two-dimensional thrust array of thrust vectoring propulsion assemblies. Propulsion assembly 102a includes various electronic components 104a including one or more batteries, one or more controllers and one or more sensors. Propulsion assembly 102a also includes a propulsion system 106a described herein as including an electric motor and a rotor assembly. In the illustrated embodiment, propulsion assembly 102a includes a two-axis gimbal 108a operated by one or more actuators 110a. In other embodiments, propulsion assembly 102a may include a single-axis gimbal or other mechanism for thrust vectoring. In still other embodiments, propulsion assembly 102a may be a non-thrust vectoring propulsion assembly.

Propulsion assembly 102b includes an electronics node 104b depicted as including one or more batteries, one or more controllers and one or more sensors. Propulsion assembly 102b also includes a propulsion system 106b and a two-axis gimbal 108b operated by one or more actuators 110b. Propulsion assembly 102c includes an electronics node 104c depicted as including one or more batteries, one or more controllers and one or more sensors. Propulsion assembly 102c also includes a propulsion system 106c and a two-axis gimbal 108c operated by one or more actuators 110c. Propulsion assembly 102d includes an electronics node 104d depicted as including one or more batteries, one or more controllers and one or more sensors. Propulsion assembly 102d also includes a propulsion system 106d and a two-axis gimbal 108d operated by one or more actuators 110d.

Flight control system 112 is operably associated with each of propulsion assemblies 102a, 102b, 102c, 102d and is linked to electronic nodes 104a, 104b, 104c, 104d by a fly-by-wire communications network depicted as arrows 114a, 114b, 114c, 114d. Flight control system 112 receives sensor data from and sends commands to propulsion assemblies 102a, 102b, 102c, 102d to enable flight control system 112 to independently control each of propulsion assemblies 102a, 102b, 102c, 102d, as discussed herein. Flight control system 112 implements adaptive transition system 116, which manages the transition of aircraft 100 from a forward flight orientation to a VTOL orientation for an approach to a target ground location in a forward flight-to-VTOL transition phase. Utilizing various systems such as sensors 118 located throughout aircraft 100, electronics components 104a, 104b, 104c, 104d and/or global positioning satellites, adaptive transition system 116 monitors one or more parameters of aircraft 100 such as the ground speed of aircraft 100 and the distance to the target ground location. In some embodiments, adaptive transition system 116 compares the ground speed of aircraft 100 to a scheduled ground speed at one or more distances to the target ground location during the forward flight-to-VTOL transition phase. The scheduled ground speed may, for example, be prescribed by a predetermined transition schedule stored by flight control system 112. In some cases, the predetermined transition schedule causes aircraft 100 to enter the VTOL orientation either before or after reaching the target ground location such as when experiencing strong winds. To prevent overshooting or undershooting the target ground location, adaptive transition system 116 modifies the conversion rate of aircraft 100 during the forward flight-to-VTOL transition phase based on the comparison between the scheduled ground speed and the actual ground speed of aircraft 100 so that aircraft 100 is substantially vertically aligned with the target ground location upon reaching the VTOL orientation.

Referring additionally to FIGS. 3A-3I in the drawings, a sequential flight-operating scenario of aircraft 100 including adaptive transition system 116 is depicted. Adaptive transition system 116 is implemented in part by flight control system 112. As best seen in FIG. 3A, aircraft 100 is in a tailsitter position on a surface such as the ground, a helipad or the deck of an aircraft carrier with landing feet 120 in contact with the surface. When aircraft 100 is ready for a mission, flight control system 112 commences operations providing flight commands to the various components of aircraft 100. Flight control system 112 may be operating responsive to autonomous flight control, remote flight control or a combination thereof. For example, it may be desirable to utilize remote flight control during certain maneuvers such as takeoff and landing but rely on autonomous flight control during hover, high speed forward flight and transitions between wing-borne flight and thrust-borne flight. In other implementations, aircraft 100 may be a manned aircraft operated at least in part by a pilot.

As best seen in FIG. 3B, aircraft 100 has performed a vertical takeoff and is engaged in thrust-borne lift in the VTOL orientation of aircraft 100. As illustrated, the rotor assemblies of propulsion assemblies 102 are each rotating in substantially the same horizontal plane. As longitudinal axis 122a and lateral axis 122b (denoted as the target) are both in a horizontal plane H that is normal to the local vertical in the earth's reference frame, aircraft 100 has a level flight attitude. In the VTOL orientation, wing 124 is the forward wing and wing 126 is the aft wing. As discussed herein, flight control system 112 independently controls and operates each propulsion assembly 102 including independently controlling speed and thrust vectoring. During hover, flight control system 112 may utilize differential speed control and/or differential or collective thrust vectoring of propulsion assemblies 102 to provide hover stability for aircraft 100 and to provide pitch, roll, yaw and translation authority for aircraft 100.

After vertical ascent to the desired elevation, aircraft 100 may begin the transition from thrust-borne lift to wing-borne lift. As best seen from the progression of FIGS. 3B-3D, aircraft 100 is operable to pitch down from the VTOL orientation toward the forward flight, or biplane, orientation to enable high speed and/or long range forward flight. As seen in FIG. 3C, longitudinal axis 122a extends out of the horizontal plane H such that aircraft 100 has an inclined flight attitude of about sixty degrees pitch down. Flight control system 112 may achieve this operation through speed control of some or all of propulsion assemblies 102, thrust vectoring of some or all of propulsion assemblies 102 or any combination thereof.

As best seen in FIGS. 3D and 3E, aircraft 100 has completed the transition to the forward flight orientation with the rotor assemblies of propulsion assemblies 102 each rotating in substantially the same vertical plane. In the forward flight orientation, wing 126 is the upper wing positioned above wing 124, which is the lower wing. By convention, longitudinal axis 122a has been reset to be in the horizontal plane H, which also includes lateral axis 122b, such that aircraft 100 has a level flight attitude in the forward flight orientation. As forward flight with wing-borne lift requires significantly less power than VTOL flight with thrust-borne lift, the operating speed of some or all of propulsion assemblies 102 may be reduced. In certain embodiments, some of propulsion assemblies 102 of aircraft 100 could be shut down during forward flight. In the forward flight orientation, the independent control provided by flight control system 112 over each propulsion assembly 102 provides pitch, roll and yaw authority for aircraft 100.

As aircraft 100 approaches target ground location 128, which may be a landing zone, payload drop zone, waypoint or other stopping point depending on the mission, aircraft 100 may begin its transition from wing-borne lift to thrust-borne lift in a forward flight-to-VTOL transition phase best seen from the progression of FIGS. 3E-3G. Aircraft 100 is operable to pitch up from the forward flight orientation to the VTOL orientation to enable, as in the illustrated example, a vertical landing operation. As seen in FIG. 3F, longitudinal axis 122a extends out of the horizontal plane H such that aircraft 100 has an inclined flight attitude of about thirty degrees pitch up. Flight control system 112 may achieve this operation through speed control of some or all of propulsion assemblies 102, thrust vectoring of some or all of propulsion assemblies 102 or any combination thereof.

The rate at which aircraft 100 rotates from the forward flight orientation shown in FIG. 3E to the VTOL orientation shown in FIG. 3G is referred to as the conversion rate. One goal in the forward flight-to-VTOL transition phase shown in FIGS. 3E-3G is for aircraft 100 to end up in the VTOL orientation at the approximate time when aircraft 100 is vertically aligned with target ground location 128 and has a ground speed of zero, thus avoiding the need for aircraft 100 to execute aggressive stopping maneuvers or hover to a location above target ground location 128 after the forward flight-to-VTOL transition phase. Because a wide variety of factors such as wind speed and wind direction influence the final location of aircraft 100 in the VTOL orientation of the forward flight-to-VTOL transition phase, flight control system 112 implements adaptive transition system 116 to take into account real-time parameters such as the ground speed of aircraft 100 and distance 130a, 130b to target ground location 128 to determine or modify the conversion rate of aircraft 100. The amount by which to adjust the conversion rate of aircraft 100 in the forward flight-to-VTOL transition phase may be determined, in some embodiments, by comparing the actual ground speed of aircraft 100 with the scheduled ground speed included in a predetermined conversion schedule at any or all distances 130a, 130b to target ground location 128 and adjusting for any detected ground speed error. Since aircraft 100 is a tailsitter aircraft, aircraft 100 is capable of rotor-borne lift at a high angle of attack and is less affected by wing stall during the forward flight-to-VTOL transition phase. Thus, in some embodiments the airspeed of aircraft 100 may be ignored or play a less crucial role in determining the conversion rate of aircraft 100 while the ground speed of aircraft 100 and distance 130a, 130b to target ground location 128 may be inclusively or exclusively used by adaptive transition system 116 to determine the conversion rate in the forward flight-to-VTOL transition phase. In FIG. 3G, aircraft 100 has completed the transition from the forward flight orientation to the VTOL orientation. Because adaptive transition system 116 has adjusted the conversion rate of aircraft 100 in the forward flight-to-VTOL transition phase shown in FIGS. 3E-3G, aircraft 100 in FIG. 3G is vertically aligned with target ground location 128 and has a zero ground speed. By convention, longitudinal axis 122a has been reset to be in the horizontal plane H which also includes lateral axis 122b such that aircraft 100 has a level flight attitude in the VTOL orientation.

Once aircraft 100 has completed the transition to the VTOL orientation, aircraft 100 may hover and commence its vertical descent to target ground location 128. In other mission types, aircraft 100 may drop a payload or perform another operation over target ground location 128. In FIG. 3H, aircraft 100 descends to target ground location 128, which in the illustrated embodiment is a landing zone. In FIG. 3I, aircraft 100 rests in its tailsitter orientation on landing zone 128.

Figure 4A:
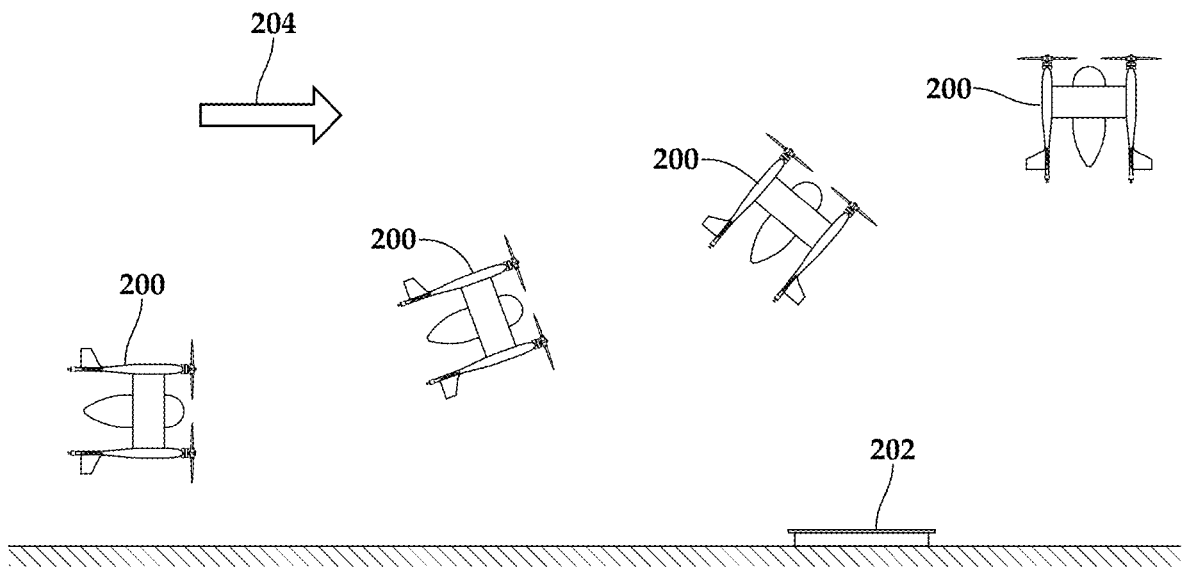
FIGS. 4A-4B are illustrations of previous aircraft transitioning from a forward flight orientation to a VTOL orientation.
Figure 4B:
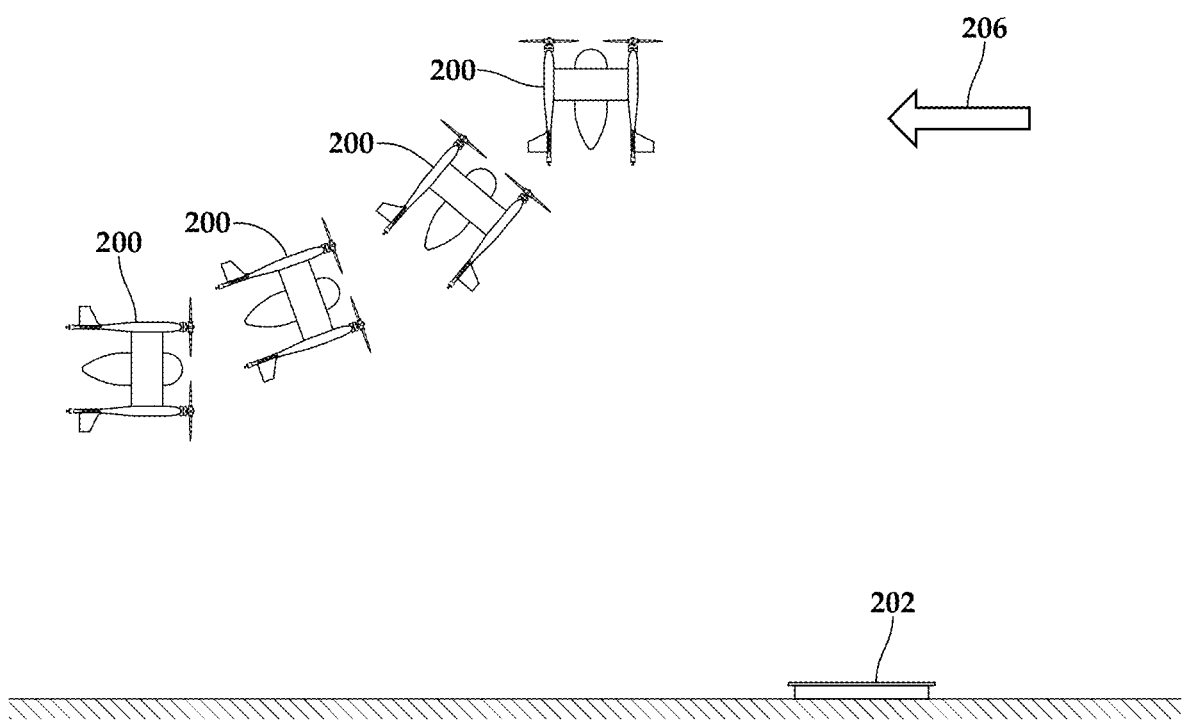

Referring to FIGS. 4A-4B in the drawings, flight operating scenarios for a previous aircraft 200 lacking the adaptive transition systems of the illustrative embodiments are depicted. More specifically, FIGS. 4A-4B show aircraft 200 transitioning from a forward flight orientation to a VTOL orientation. The point at which aircraft 200 begins the forward flight-to-VTOL transition phase when approaching target ground location 202 is estimated by a user based on ground-level winds and the payload of aircraft 200, at which point aircraft 200 has a fixed conversion rate per a fixed transition schedule from the forward flight orientation to the VTOL orientation. Reliance on such a user estimate often results in overshooting or undershooting the target ground location, which in turn increases the hover time of aircraft 200 and increases the likelihood of resorting to aggressive stopping maneuvers. For example, in FIG. 4A aircraft 200 experiences a tail wind 204 while transitioning from the forward flight orientation to the VTOL orientation. Because aircraft 200 rotates at a fixed conversion rate, tail wind 204 is unaccounted for and causes aircraft 200 to overshoot target ground location 202. Conversely, in FIG. 4B aircraft 200 experiences a head wind 206 that is unaccounted for in the conversion rate of aircraft 200, causing aircraft 200 to undershoot target ground location 202. In the examples shown in both FIGS. 4A and 4B, aircraft 200 is not vertically aligned with target ground location 202 when it reaches the VTOL orientation of the forward flight-to-VTOL transition phase and is therefore forced to expend additional energy in sideward hover to position itself over target ground location 202. The illustrative embodiments take the guesswork out of properly executing the forward flight-to-VTOL transition phase during an approach to a target ground location by taking into account a number of factors such as ground speed and the distance to the target ground location to make real-time adjustments to the conversion rate.

Figure 5:
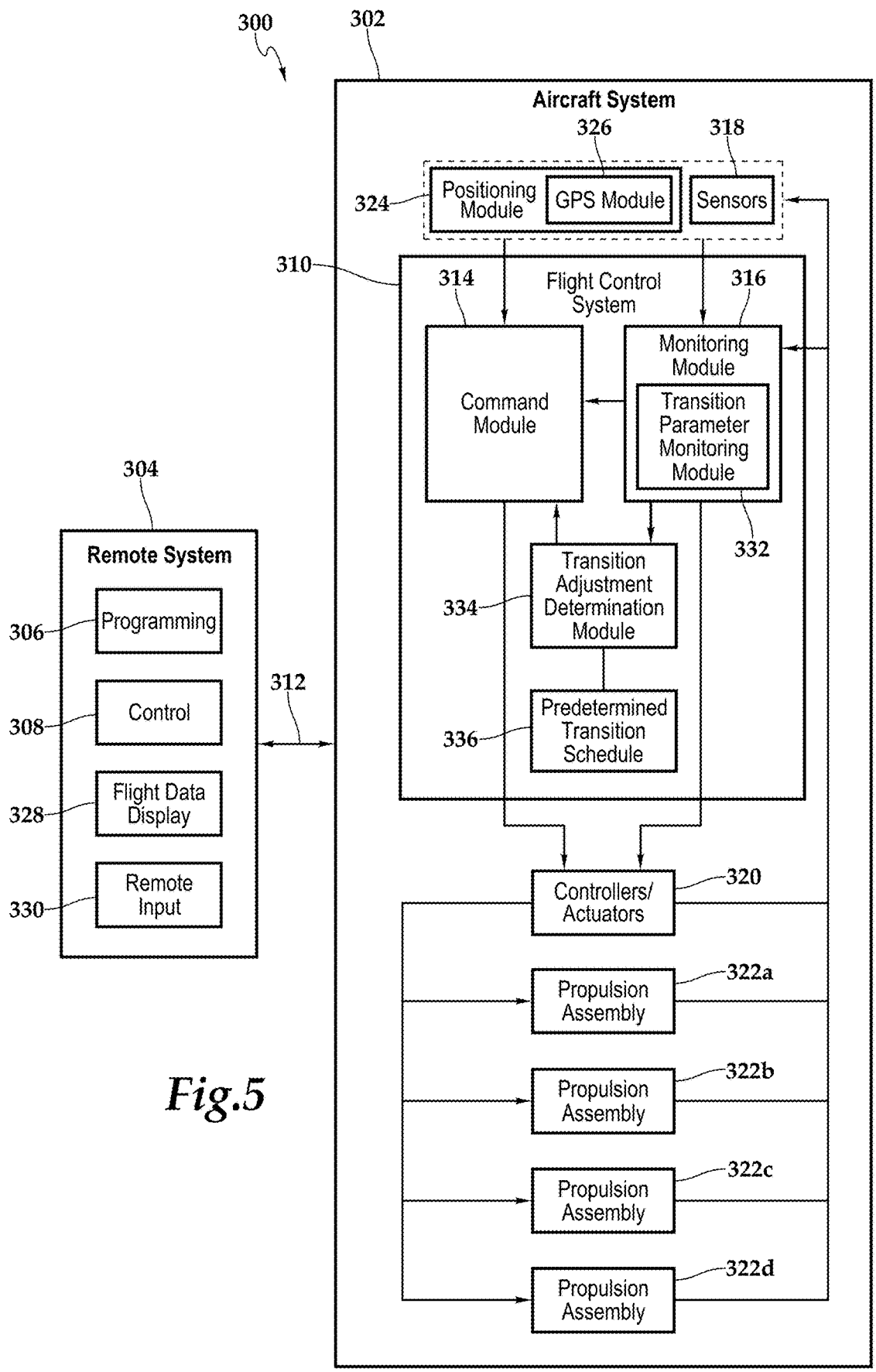
FIG. 5 is a block diagram of autonomous and remote control systems for an aircraft having an adaptive transition system in accordance with embodiments of the present disclosure.

Referring to FIG. 5 in the drawings, a block diagram depicts a control system 300 including an adaptive transition system operable for use with aircraft 10 or aircraft 100 of the present disclosure as well as other aircraft types. In the illustrated embodiment, system 300 includes two primary computer based subsystems; namely, an aircraft system 302 and a remote system 304. In some implementations, remote system 304 includes a programming application 306 and a remote control application 308. Programming application 306 enables a user to provide a flight plan and mission information including a target ground location to aircraft 302 such that flight control system 310 may engage in autonomous control over aircraft 302. For example, programming application 306 may communicate with flight control system 310 over a wired or wireless communication channel 312 to provide a flight plan including, for example, a starting point, a trail of waypoints, an ending point and/or a target ground location such as a landing zone or payload drop zone such that flight control system 310 may use waypoint navigation during the mission. The target ground location provided by remote system 304 may be used by the adaptive transition system to calculate the distance between aircraft 302 and the target ground location. In addition, programming application 306 may provide one or more tasks to flight control system 310 for aircraft 302 to accomplish during the mission such as delivery of a payload to the target ground location. Following programming, aircraft 302 may operate autonomously responsive to commands generated by flight control system 310. In other examples, the target ground location may be preprogrammed in flight control system 310 prior to takeoff instead of relying on remote system 304 to receive the target ground location.

In the illustrated embodiment, flight control system 310 includes a command module 314 and a monitoring module 316. It is to be understood by those skilled in the art that these and other modules executed by flight control system 310 may be implemented in a variety of forms including hardware, software, firmware, special purpose processors and combinations thereof. Flight control system 310 receives input from a variety of sources including internal sources such as sensors 318, controllers/actuators 320, propulsion assemblies 322a, 322b, 322c, 322d, a positioning module 324, which may include a global positioning satellite (GPS) module 326, as well as external sources such as remote system 304, global positioning system satellites or other location positioning systems and the like.

During the various operating modes of aircraft 302 such as the vertical takeoff flight mode, the hover flight mode, the forward flight mode, transition flight modes and the vertical landing flight mode, command module 314 provides commands to controllers/actuators 320. These commands enable independent operation of propulsion assemblies 322a, 322b, 322c, 322d including rotor speed, thrust vector and the like. Flight control system 310 receives feedback from controllers/actuators 320 and propulsion assemblies 322a, 322b, 322c, 322d. This feedback is processed by monitoring module 316 that can supply correction data and other information to command module 314 and to controllers/actuators 320. Sensors 318 and positioning module 324 such as an attitude and heading reference system (AHRS) with solid-state or microelectromechanical systems (MEMS) gyroscopes, accelerometers and magnetometers as well as other sensors including positioning sensors, speed sensors, environmental sensors, fuel sensors, temperature sensors, location sensors and the like also provide information to flight control system 310 to further enhance autonomous control capabilities.

Some or all of the autonomous control capability of flight control system 310 can be augmented or supplanted by remote flight control from, for example, remote system 304. Remote system 304 may include one or computing systems that may be implemented on general-purpose computers, special purpose computers or other machines with memory and processing capability. The computing systems may be microprocessor-based systems operable to execute program code in the form of machine-executable instructions. In addition, the computing systems may be connected to other computer systems via a proprietary encrypted network, a public encrypted network, the Internet or other suitable communication network that may include both wired and wireless connections. Remote system 304 communicates with flight control system 310 via a communication link 312 that may include both wired and wireless connections.

While operating remote control application 308, remote system 304 is configured to display information relating to one or more aircraft of the present disclosure on one or more flight data display devices 328. Display devices 328 may be configured in any suitable form, including, for example, liquid crystal displays, light emitting diode displays or any suitable type of display. Remote system 304 may also include audio output and input devices such as a microphone, speakers and/or an audio port allowing an operator to communicate with other operators or a base station. Display device 328 may also serve as a remote input device 330 if a touch screen display implementation is used, however, other remote input devices, such as a keyboard or joystick, may alternatively be used to allow an operator to provide control commands to an aircraft being operated responsive to remote control.

When aircraft 302 approaches the target ground location, a transition parameter monitoring module 332 monitors one or more parameters associated with the transition of aircraft 302 from the forward flight orientation to the VTOL orientation in the forward flight-to-VTOL transition phase such as the ground speed of aircraft 302 and the horizontal distance between aircraft 302 and the target ground location. The ground speed of aircraft 302 may be determined or calculated by transition parameter monitoring module 332 in numerous ways such as by using the position of aircraft 302 determined by GPS or other positioning modules, inertial sensors, ground speed commands to propulsion assemblies 322a, 322b, 322c, 322d, airspeed, a navigation system, an AHRS or any combination thereof. For example, the ground speed of aircraft 302 may be determined using ground speed commands from command module 314 as modified by feedback loops indicating any error between the commanded and actual ground speed. The distance between aircraft 302 and the target ground location may also be determined or calculated in numerous ways by transition parameter monitoring module 332 such as by referencing the position of aircraft 302 as determined by positioning module 324 and the target ground location received from remote system 304, preprogrammed in flight control system 310 or, in the case of manned aircraft, inputted by a pilot. In some embodiments, GPS module 326 detects the position of aircraft 302 and transition parameter monitoring module 332 determines the ground speed of aircraft 302 and the distance between aircraft 302 and the target ground location based at least partially on the position of aircraft 302 detected by GPS module 326.

Flight control system 310 includes a transition adjustment determination module 334, which adjust the conversion rate of aircraft 302 from the forward flight orientation to the VTOL orientation based on the ground speed of aircraft 302 and the distance to the target ground location monitored by transition parameter monitoring module 332 such that aircraft 302 is substantially vertically aligned with the target ground location in the VTOL orientation of the forward flight-to-VTOL transition phase, resulting in aircraft 302 having a substantially zero ground speed over the target ground location. Transition adjustment determination module 334 may utilize predetermined transition schedule 336 to determine the amount by which to adjust the conversion rate of aircraft 302. Predetermined transition schedule 336 includes a scheduled conversion rate, which in some cases may be a fixed conversion rate, for aircraft 302 throughout the forward flight-to-VTOL transition phase. The scheduled conversion rate corresponds to a scheduled ground speed for aircraft 302 at a plurality of distances to the target ground location in the forward flight-to-VTOL transition phase.

In some embodiments, transition adjustment determination module 334 compares the actual ground speed of aircraft 302, determined as indicated above using positioning module 324, sensors 318 or other methods, with the scheduled ground speed indicated by predetermined transition schedule 336 at one or more distances to the target ground location. For example, transition adjustment determination module 334 may continuously compare the actual ground speed of aircraft 302 with the scheduled ground speed throughout the forward flight-to-VTOL transition phase as aircraft 302 approaches the target ground location. Transition adjustment determination module 334 may then modify the conversion rate of aircraft 302 in the forward flight-to-VTOL transition phase based on the comparison between the actual ground speed of aircraft 302 and the scheduled ground speed.

In some embodiments, at each distance or location at which the actual ground speed of aircraft 302 is compared with the scheduled ground speed, transition adjustment determination module 334 may determine a ground speed error between these two parameters. Once the ground speed error has been determined, a number of operations may be performed by transition adjustment determination module 334 in conjunction with command module 314 to ensure that aircraft 302 ends up in the VTOL orientation vertically aligned above the target ground location at the end of the forward flight-to-VTOL transition phase. Such operations may include adjusting the conversion rate of aircraft 302 from the forward flight orientation to the VTOL orientation in proportion to the ground speed error. For example, transition adjustment determination module 334 may increase the conversion rate of aircraft 302 from the forward flight orientation to the VTOL orientation in response to the ground speed exceeding the scheduled ground speed. Conversely, transition adjustment determination module 334 may decrease the conversion rate of aircraft 302 from the forward flight orientation to the VTOL orientation in response to the ground speed being less than the scheduled ground speed. In addition, depending on the implementation, such operations in response to the ground speed error may be performed only when the ground speed error exceeds a predetermined threshold to prevent conversion rate adjustments in response to negligible ground speed errors. In other implementations, however, even small ground speed errors may be taken into account when adjusting the conversion rate to provide a continuous feedback loop that guides the transition of aircraft 302 throughout the forward flight-to-VTOL transition phase. In addition, transition adjustment determination module 334 may limit the conversion rate of aircraft 302 in the forward flight-to-VTOL transition phase from exceeding an upper conversion rate threshold regardless of the ground speed error to prevent aircraft 302 from transitioning too quickly, which could compromise the flight integrity or payload of aircraft 302. In other embodiments, transition adjustment determination module 334 and/or command module 314 may output a ground speed command, which may be rate limited, to control the conversion rate of aircraft 302 as it approaches the target ground location.

Figure 6C:
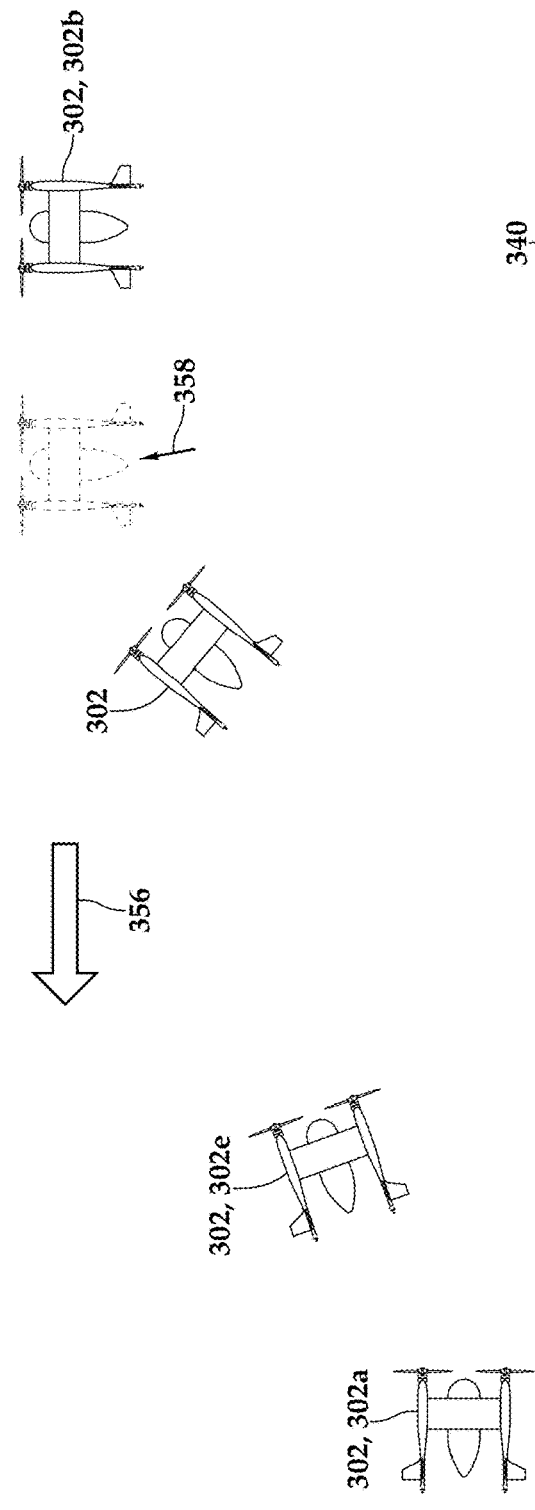

Referring additionally to FIGS. 6A-6F in the drawings, aircraft 302 is shown in various sequential flight operating scenarios with different wind conditions. In FIGS. 6A-6B, aircraft 302 transitions from forward flight orientation 302a to VTOL orientation 302b in the forward flight-to-VTOL transition phase as it approaches target ground location 340. FIG. 6B shows scheduled ground speed 342 indicated by predetermined transition schedule 336 and the measured ground speed 344 of aircraft 302 over the range of distances to target ground location 340 during the forward flight-to-VTOL transition phase. As shown in FIG. 6A, aircraft 302 experiences tail wind 346 pushing aircraft 302 toward target ground location 340 during the forward flight-to-VTOL transition phase. Previously implemented aircraft have obeyed a fixed transition schedule with a fixed conversion rate and a predicted scheduled ground speed 342. Since certain environmental conditions such as tail wind 346 are unaccounted for, however, such previously implemented aircraft fail to decelerate to zero ground speed upon reaching target ground location 340, causing the aircraft to overshoot target ground location 340 and end up in the position indicated by arrow 348. The illustrative embodiments address this issue by including an adaptive transition system that adjusts the conversion rate of aircraft 302 to account for tail wind 346.

Transition adjustment determination module 334 compares ground speed 344 with scheduled ground speed 342 at one or more distances to target ground location 340, including, in some embodiments, multiple or all distances to target ground location 340. In the illustrated example, presented for purposes of clarifying the operation of the illustrative embodiments, transition adjustment determination module 334 compares ground speed 344 with scheduled ground speed 342 when aircraft 302 is in position 302c at distance 302d from target ground location 340. At distance 302d, transition adjustment determination module 334 determines ground speed error 350 and adjusts the conversion rate of aircraft 302 in proportion to ground speed error 350. More particularly, transition adjustment determination module 334 increases the conversion rate of aircraft 302 from forward flight orientation 302a to VTOL orientation 302b in response to ground speed 344 exceeding scheduled ground speed 342 such that aircraft 302 is vertically aligned with target ground location 340 in VTOL orientation 302b of the forward flight-to-VTOL transition phase and also has a zero ground speed over target ground location 340. Aircraft 302 may then perform any desired operation over target ground location 340 such as vertically landing on target ground location 340 and/or dropping a payload on target ground location 340.

Figure 6D:
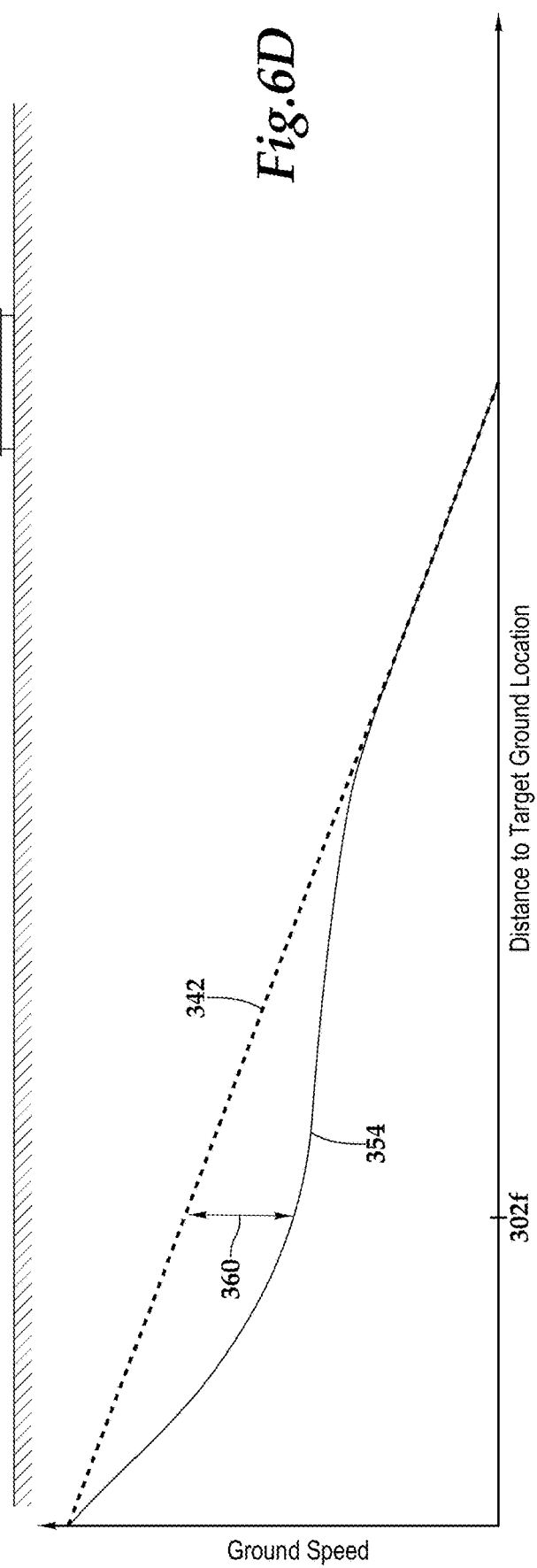

In FIGS. 6C-6D, aircraft 302 transitions from forward flight orientation 302a to VTOL orientation 302b in the forward flight-to-VTOL transition phase as it approaches target ground location 340. FIG. 6D shows scheduled ground speed 342 indicated by predetermined transition schedule 336 and the measured ground speed 354 of aircraft 302 over the range of distances to target ground location 340 during the forward flight-to-VTOL transition phase. As shown in FIG. 6C, aircraft 302 experiences head wind 356 pushing aircraft 302 away from target ground location 340 during the forward flight-to-VTOL transition phase. Previously implemented aircraft have obeyed a fixed transition schedule with a fixed conversion rate and a predicted scheduled ground speed 342. Since certain environmental conditions such as head wind 356 are unaccounted for, however, such previously implemented aircraft undershoot target ground location 340 and end up in the position indicated by arrow 358. The illustrative embodiments address this issue by including an adaptive transition system that adjusts the conversion rate of aircraft 302 to account for head wind 356.

Transition adjustment determination module 334 compares ground speed 354 with scheduled ground speed 342 at one or more distances to target ground location 340, including, in some embodiments, multiple or all distances to target ground location 340. In the illustrated example, presented for purposes of clarifying the operation of the illustrative embodiments, transition adjustment determination module 334 compares ground speed 354 with scheduled ground speed 342 when aircraft 302 is in position 302e at distance 302f from target ground location 340. At distance 302f, transition adjustment determination module 334 determines ground speed error 360 and adjusts the conversion rate of aircraft 302 in proportion to ground speed error 360. More particularly, transition adjustment determination module 334 decreases the conversion rate of aircraft 302 from forward flight orientation 302a to VTOL orientation 302b in response to scheduled ground speed 342 exceeding ground speed 354 such that aircraft 302 is vertically aligned with target ground location 340 in VTOL orientation 302b of the forward flight-to-VTOL transition phase and also has a zero ground speed over target ground location 340. Aircraft 302 may then perform any desired operation over target ground location 340 such as vertically landing on target ground location 340 and/or dropping a payload on target ground location 340.

Figure 6E:
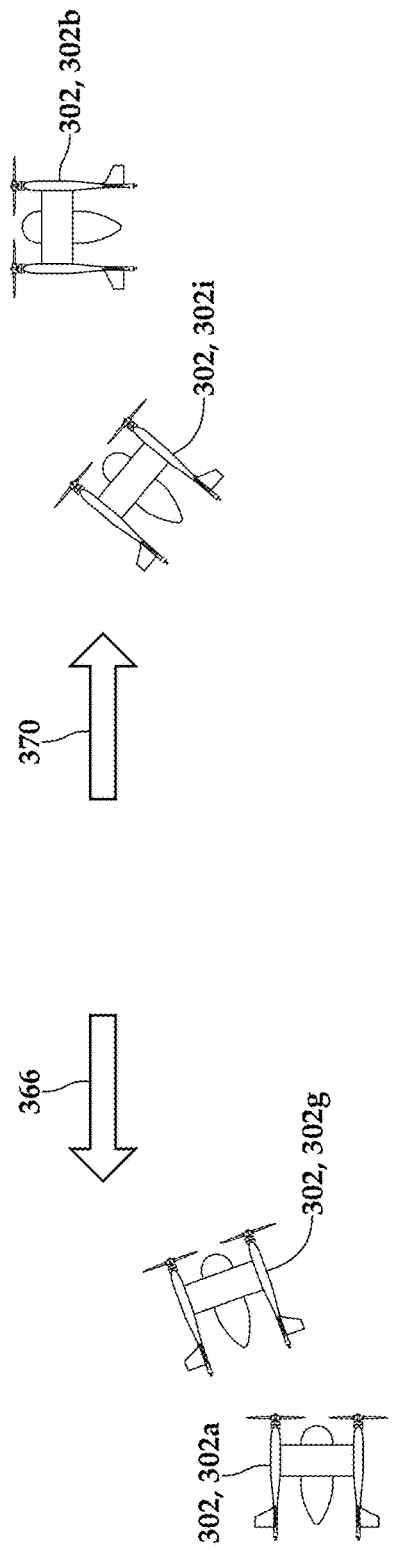
Figure 6F:
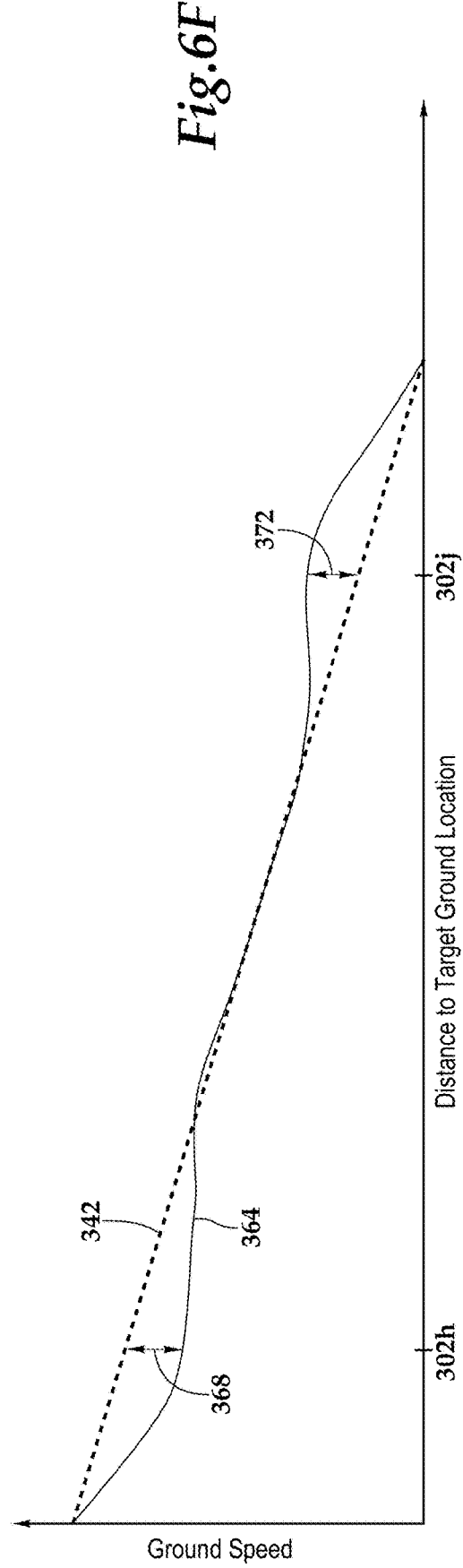

In FIGS. 6E-6F, aircraft 302 transitions from forward flight orientation 302a to VTOL orientation 302b in the forward flight-to-VTOL transition phase as it approaches target ground location 340. FIG. 6F shows scheduled ground speed 342 indicated by predetermined transition schedule 336 and the measured ground speed 364 of aircraft 302 over the range of distances to target ground location 340 during the forward flight-to-VTOL transition phase. As shown in FIG. 6E, aircraft 302 experiences head wind 366 pushing aircraft 302 away from target ground location 340 during the forward flight-to-VTOL transition phase. Transition adjustment determination module 334 compares ground speed 364 with scheduled ground speed 342 when aircraft 302 is in position 302g at distance 302h from target ground location 340. At distance 302h, transition adjustment determination module 334 determines ground speed error 368 and decreases the conversion rate of aircraft 302 from forward flight orientation 302a to VTOL orientation 302b in proportion to ground speed error 368 in response to scheduled ground speed 342 exceeding ground speed 364.

Later in the forward flight-to-VTOL transition phase, aircraft 302 experiences a gust shown as tail wind 370. Transition adjustment determination module 334 compares ground speed 364 with scheduled ground speed 342 when aircraft 302 is in position 302i at distance 302j from target ground location 340. At distance 302j, transition adjustment determination module 334 determines ground speed error 372 and adjusts the conversion rate of aircraft 302 in proportion to ground speed error 372. More particularly, transition adjustment determination module 334 increases the conversion rate of aircraft 302 from forward flight orientation 302a to VTOL orientation 302b in proportion to ground speed error 372 in response to ground speed 364 exceeding scheduled ground speed 342 such that aircraft 302 is vertically aligned with target ground location 340 in VTOL orientation 302b of the forward flight-to-VTOL transition phase and also has a zero ground speed over target ground location 340. Aircraft 302 may then perform any desired operation over target ground location 340 such as vertically landing on target ground location 340 and/or dropping a payload on target ground location 340. The adaptive transition systems described herein help to ensure a smooth and reliable conversion in the forward flight-to-VTOL transition phase that positions aircraft 302 over target ground location 340 accurately and repeatedly. The illustrative embodiments also eliminate the guesswork required in previous aircraft by reducing reliance on user skill and knowledge to navigate aircraft 302 over target ground location 340, in some cases without relying on the knowledge of airspeed or aircraft inertia.

Figure 7B:
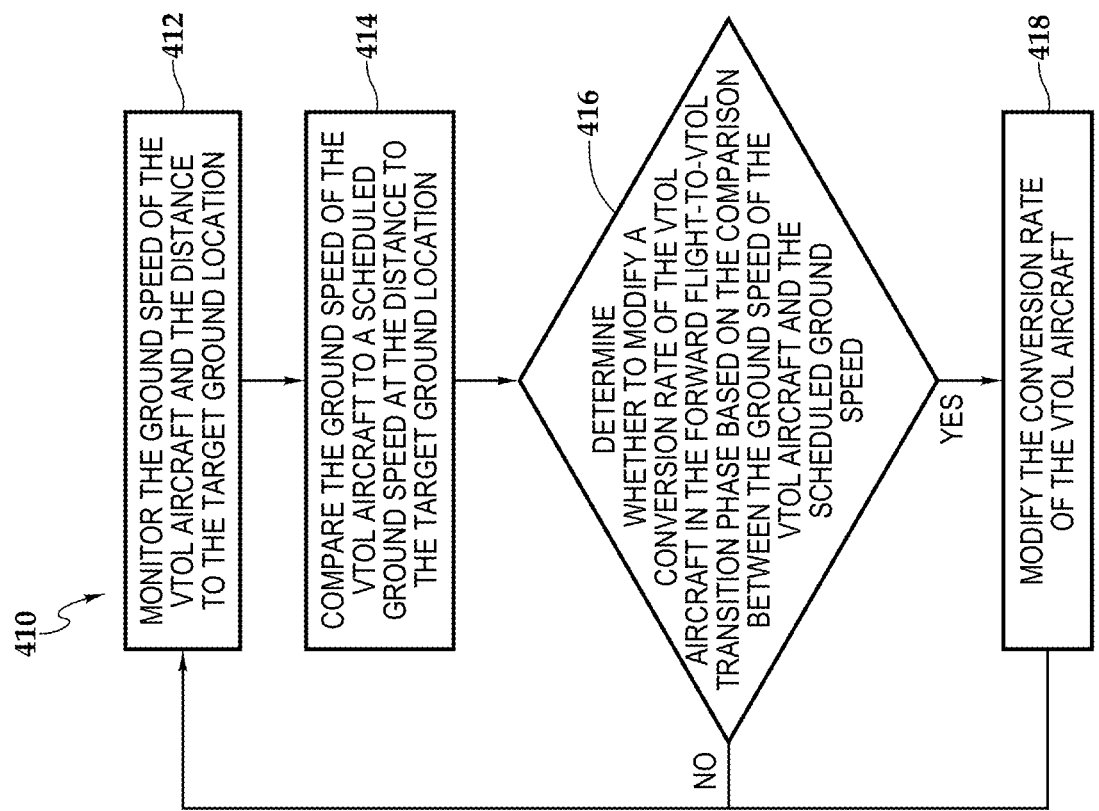
FIGS. 7A-7D are flowcharts of various methods for managing a transition of a VTOL aircraft from a forward flight orientation to a VTOL orientation for an approach to a target ground location in accordance with embodiments of the present disclosure.
Figure 7A:
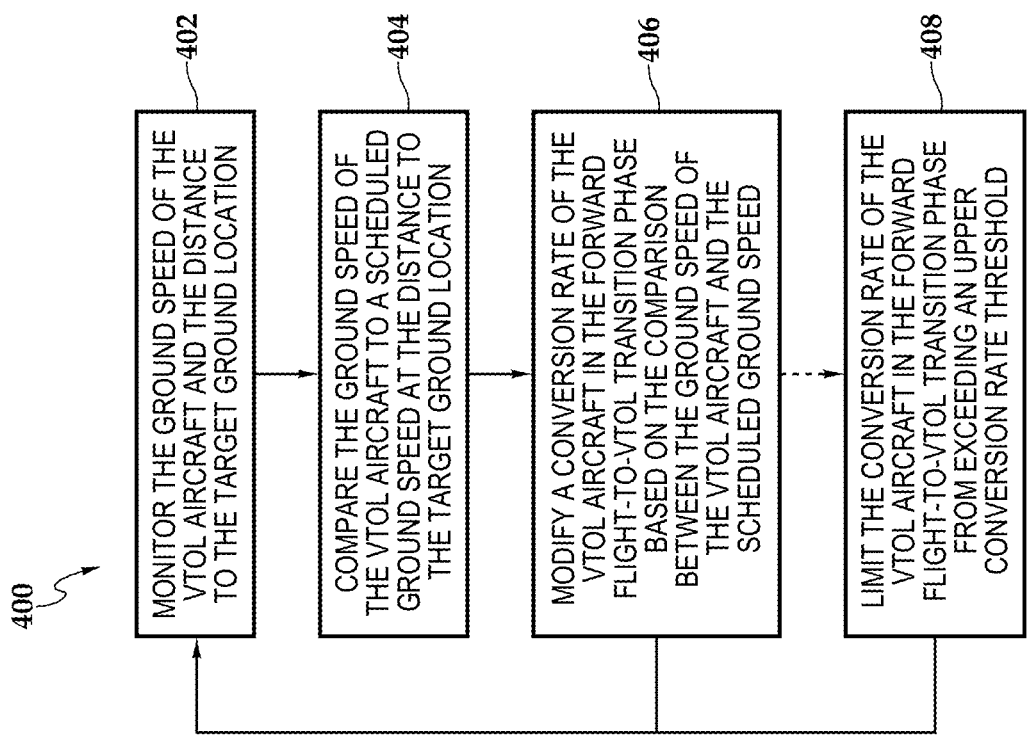

Referring to FIGS. 7A-7D in the drawings, various methods for managing a transition of a VTOL aircraft from a forward flight orientation to a VTOL orientation for an approach to a target ground location in a forward flight-to-VTOL transition phase are depicted. Each method enables the VTOL aircraft to reach the VTOL orientation of the forward flight-to-VTOL transition phase in vertical alignment with the target ground location so that additional operations may be performed over the target ground location such as a vertical landing or payload drop. In FIG. 7A, method 400 includes monitoring the ground speed of the VTOL aircraft and the distance between the VTOL aircraft and the target ground location (step 402) and comparing the ground speed of the VTOL aircraft to a scheduled ground speed at the distance to the target ground location (step 404). The scheduled ground speed may be indicated by a fixed or predetermined transition schedule for the VTOL aircraft. Step 404 may include comparing the ground speed of the VTOL aircraft to the scheduled ground speed at multiple distances to the target ground location in the forward flight-to-VTOL transition phase. Method 400 includes modifying the conversion rate of the VTOL aircraft in the forward flight-to-VTOL transition phase based on the comparison between the ground speed of the VTOL aircraft and the scheduled ground speed (step 406). Method 400 may then return to step 402. In some implementations, method 400 may also include limiting the conversion rate of the VTOL aircraft in the forward flight-to-VTOL transition phase from exceeding an upper conversion rate threshold (step 408), returning to step 402 thereafter.

In FIG. 7B, method 410 includes monitoring the ground speed of the VTOL aircraft and the distance to the target ground location (step 412) and comparing the ground speed of the VTOL aircraft to a scheduled ground speed at one or more distances to the target ground location (step 414). Method 410 includes determining whether to modify the conversion rate of the VTOL aircraft in the forward flight-to-VTOL transition phase based on the comparison between the ground speed of the VTOL aircraft and the scheduled ground speed (step 416). If method 410 determines not to modify the conversion rate of the VTOL aircraft in the forward flight-to-VTOL transition phase based on the comparison between the ground speed of the VTOL aircraft and the scheduled ground speed, then method 410 returns to step 412 to continue monitoring the ground speed of the VTOL aircraft and the distance to the target ground location. If method 410 determines to modify the conversion rate of the VTOL aircraft in the forward flight-to-VTOL transition phase based on the comparison between the ground speed of the VTOL aircraft and the scheduled ground speed, then method 410 modifies the conversion rate of the VTOL aircraft (step 418). Method 410 may then return to step 412.

Figure 7D:
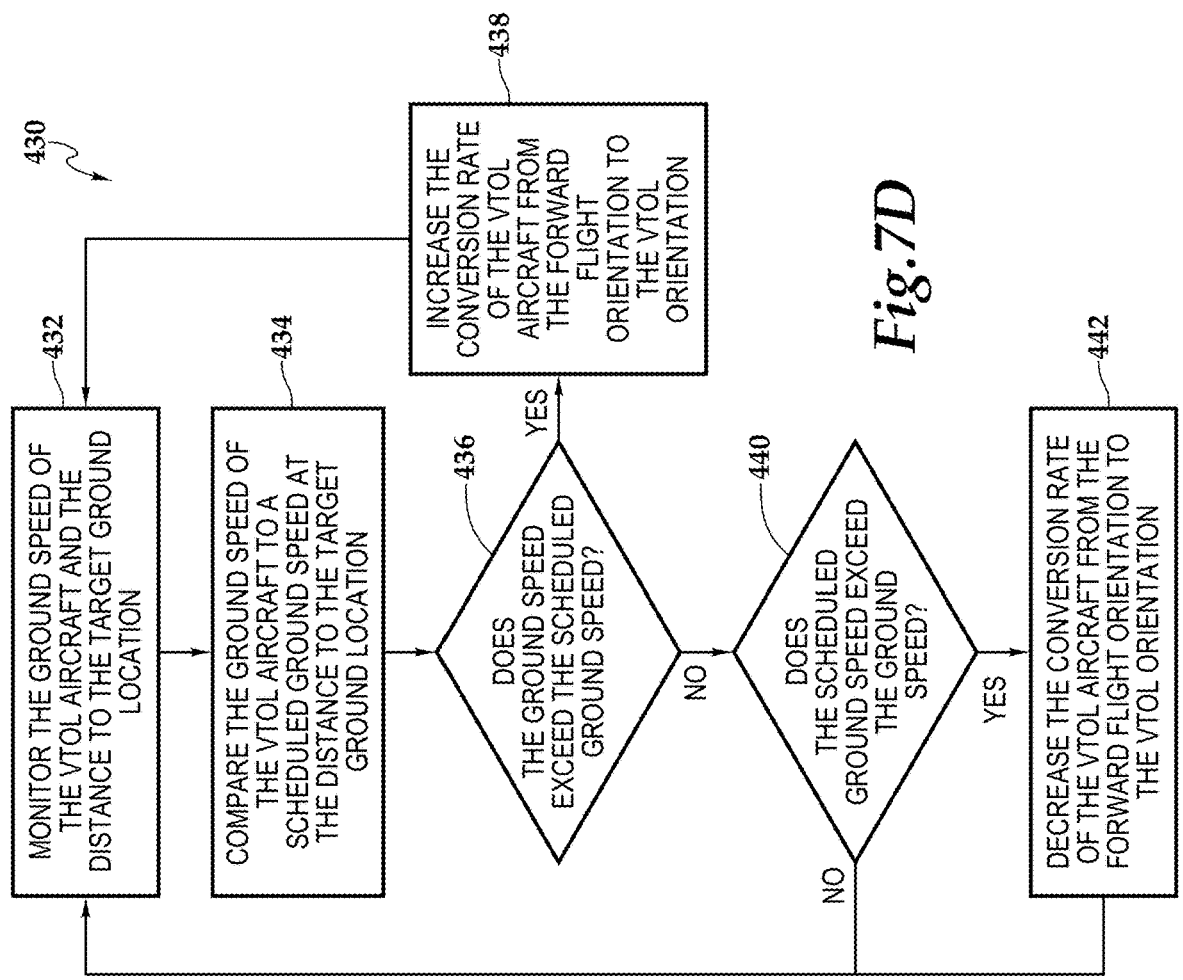
Figure 7C:
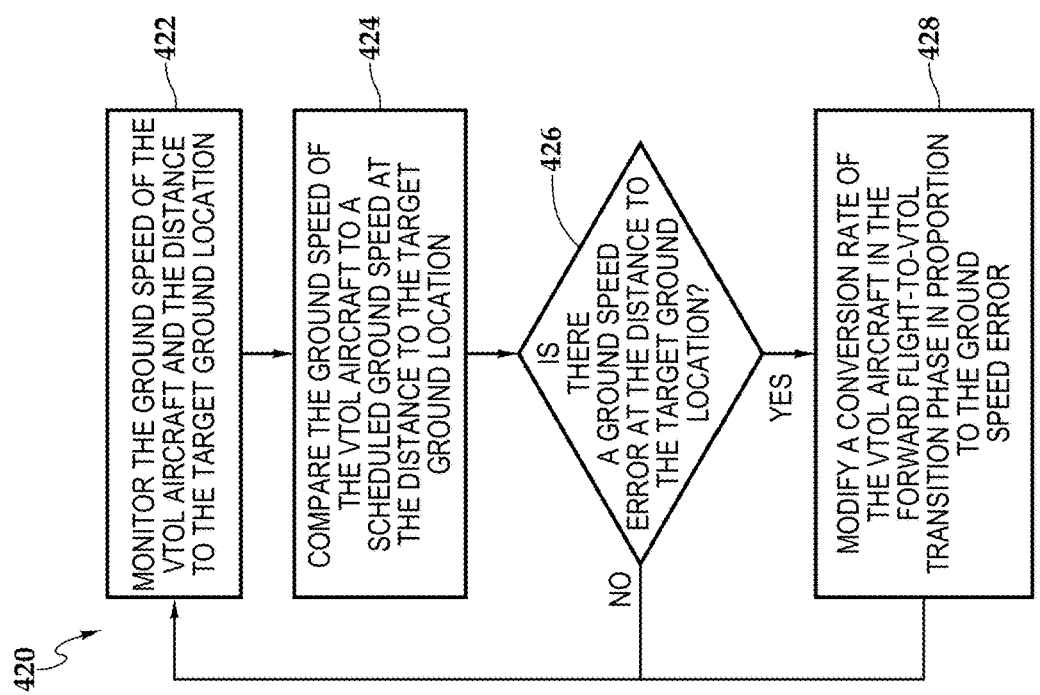

In FIG. 7C, method 420 includes monitoring the ground speed of the VTOL aircraft and the distance to the target ground location (step 422) and comparing the ground speed of the VTOL aircraft to a scheduled ground speed at one or more distances to the target ground location (step 424). Method 420 includes determining whether there is a ground speed error at the distance to the target ground location (step 426). If method 420 determines that there is not a ground speed error at the distance to the target ground location, then method 420 returns to step 422 to continue monitoring the ground speed of the VTOL aircraft and the distance to the target ground location. If method 420 determines that there is a ground speed error at the distance to the target ground location, then method 420 modifies the conversion rate of the VTOL aircraft in the forward flight-to-VTOL transition phase in proportion to the ground speed error (step 428). Method 420 may then return to step 422.

In FIG. 7D, method 430 includes monitoring the ground speed of the VTOL aircraft and the distance to the target ground location (step 432) and comparing the ground speed of the VTOL aircraft to a scheduled ground speed at one or more distances to the target ground location (step 434). Method 430 includes determining whether the ground speed exceeds the scheduled ground speed (step 436). If method 430 determines that the ground speed exceeds the scheduled ground speed, as may occur when the VTOL aircraft experiences a tail wind, method 430 increases the conversion rate of the VTOL aircraft from the forward flight orientation to the VTOL orientation (step 438), after which method 430 returns to step 432 to continue monitoring the ground speed of the VTOL aircraft and the distance to the target ground location. If method 430 does not determine that the ground speed exceeds the scheduled ground speed, method 430 determines whether the scheduled ground speed exceeds the ground speed (step 440). If method 430 does not determine that the scheduled ground speed exceeds the ground speed, method 430 returns to step 432. If method 430 determines that the scheduled ground speed exceeds the ground speed, as may occur when the VTOL aircraft experiences a head wind, method 430 decreases the conversion rate of the VTOL aircraft from the forward flight orientation to the VTOL orientation (step 442), after which method 430 returns to step 432.

The flowcharts in the different depicted embodiments illustrate the architecture, functionality and operation of some possible implementations of apparatus, methods and computer program products. In this regard, each block in the flowchart may represent a module, segment or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

Figure 8A:
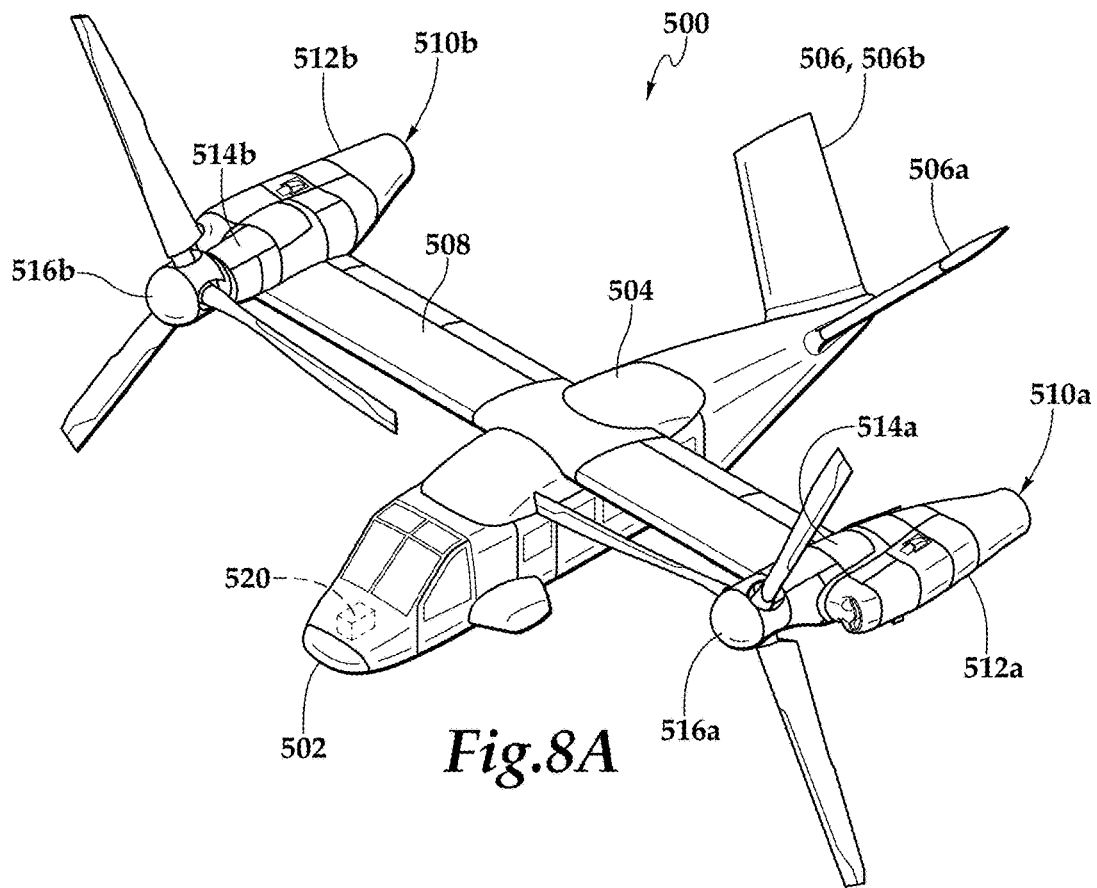
FIGS. 8A-8B are schematic illustrations of a tiltrotor aircraft having an adaptive transition system in accordance with embodiments of the present disclosure.
Figure 8B:
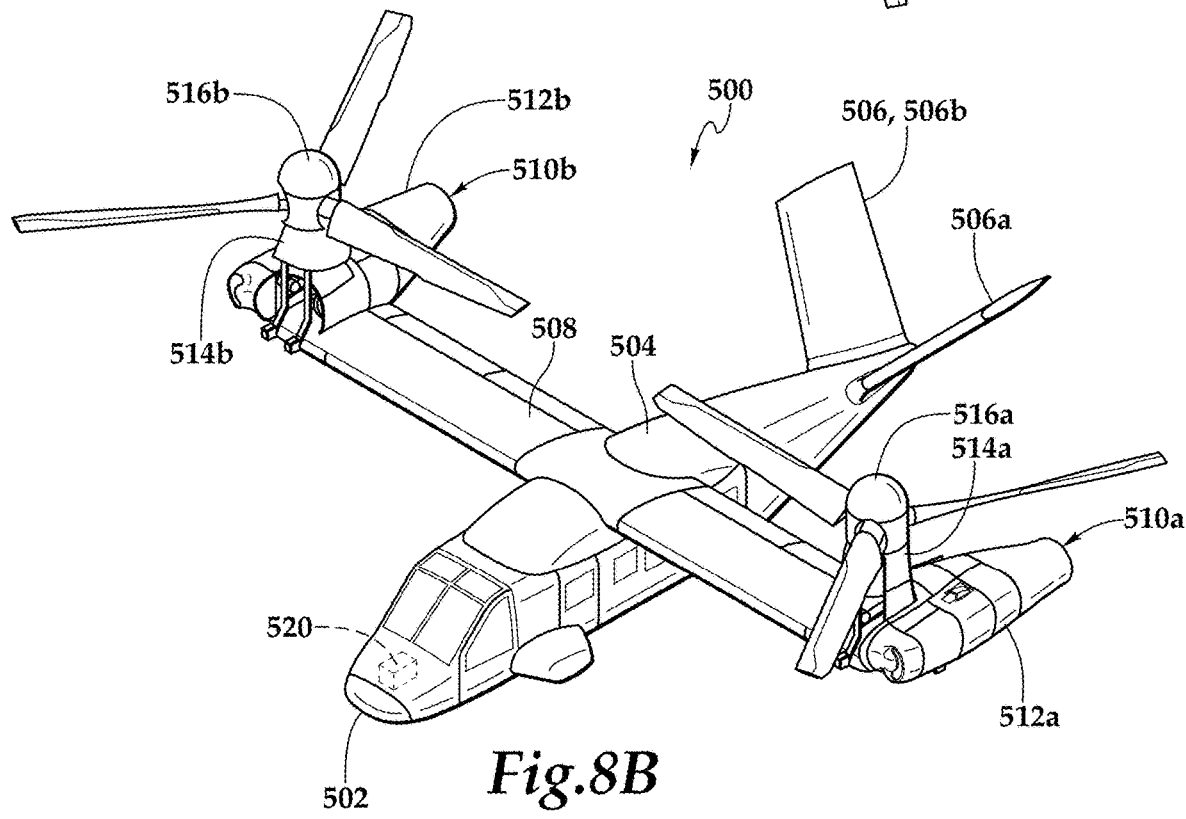

Referring to FIGS. 8A-8B in the drawings, a tiltrotor aircraft having an adaptive transition system is schematically illustrated and generally designated 500. Tiltrotor aircraft 500 includes a fuselage 502, a wing mount assembly 504 and a tail assembly 506 including rotatably mounted tail members 506a, 506b having control surfaces operable for horizontal and/or vertical stabilization during forward flight. A wing assembly 508 is supported by wing mount assembly 504. Coupled to outboard ends of wing assembly 508 are propulsion assemblies 510a, 510b. Propulsion assembly 510a includes a nacelle depicted as fixed pylon 512a that houses an engine and a transmission. Thus, the nacelle is fixed relative to wing assembly 508. In addition, propulsion assembly 510a includes a mast assembly 514a having a mast that is rotatable relative to fixed pylon 512a, wing assembly 508 and fuselage 502 between a generally horizontal orientation, as best seen in FIG. 8A, and a generally vertical orientation, as best seen in FIG. 8B. Propulsion assembly 510a also includes a proprotor assembly 516a, including proprotor blade assemblies radiating therefrom, which is rotatable responsive to torque and rotational energy provided via a rotor hub assembly and drive system mechanically coupled to the engine and transmission housed by fixed pylon 512a. Similarly, propulsion assembly 510b includes a nacelle depicted as fixed pylon 512b that houses an engine and transmission and a mast assembly 514b that is rotatable relative to fixed pylon 512b, wing assembly 508 and fuselage 502. Propulsion assembly 510b also includes a proprotor assembly 516b, including proprotor blade assemblies radiating therefrom, which is rotatable responsive to torque and rotational energy provided via a rotor hub assembly and drive system mechanically coupled to the engine and transmission housed by fixed pylon 512b.

FIG. 8A illustrates tiltrotor aircraft 500 in airplane or forward flight mode, or orientation, in which proprotor assemblies 516a, 516b are rotating in a substantially vertical plane to provide a forward thrust enabling wing assembly 508 to provide a lifting force responsive to forward airspeed, such that tiltrotor aircraft 500 flies much like a conventional propeller driven aircraft. FIG. 8B illustrates tiltrotor aircraft 500 in helicopter or VTOL flight mode, or orientation, in which proprotor assemblies 516a, 516b are rotating in a substantially horizontal plane to provide a lifting thrust, such that tiltrotor aircraft 500 flies much like a conventional helicopter. It should be appreciated that tiltrotor aircraft 500 can be operated such that proprotor assemblies 516a, 516b are selectively positioned between forward flight mode and VTOL flight mode, which can be referred to as a conversion flight mode. Even though tiltrotor aircraft 500 has been described as having one engine in each fixed pylon 512a, 512b, it should be understood by those having ordinary skill in the art that other engine arrangements are possible and are considered to be within the scope of the present disclosure including, for example, having a single engine which may be housed within fuselage 502 that provides torque and rotational energy to both proprotor assemblies 516a, 516b.

As tiltrotor aircraft 500 approaches a target ground location such as a landing zone, waypoint or payload drop zone, tiltrotor aircraft 500 converts from the forward flight mode shown in FIG. 8A to the VTOL mode shown in FIG. 8B at a conversion rate. Tiltrotor aircraft 500 includes a flight control system 520 that implements an adaptive transition system of the illustrative embodiments as described herein. The adaptive transition system adjusts the conversion rate of tiltrotor aircraft 500 in the transition from the forward flight mode to the VTOL flight mode based on a number of aircraft parameters such as ground speed and distance to the target ground location. Such real-time adjustment of the conversion rate during the approach toward the target ground location enables tiltrotor aircraft 500 to be substantially vertically aligned with the target ground location when tiltrotor aircraft 500 reaches the VTOL orientation. Indeed, tiltrotor aircraft 500 is illustrative of the wide variety of VTOL aircraft that may implement the adaptive transition systems of the illustrative embodiments described herein.

Referring additionally to FIGS. 9A-9B in the drawings, tiltrotor aircraft 500 is shown in a sequential flight operating scenario. More particularly, tiltrotor aircraft 500 transitions from forward flight mode 500a to VTOL flight mode 500b in the forward flight-to-VTOL transition phase as it approaches target ground location 522. FIG. 9B shows scheduled ground speed 524 indicated by a predetermined transition schedule and the measured ground speed 526 of tiltrotor aircraft 500 over the range of distances to target ground location 522 during the forward flight-to-VTOL transition phase. As shown in FIG. 9A, tiltrotor aircraft 500 experiences head wind 528 pushing tiltrotor aircraft 500 away from target ground location 522 during the forward flight-to-VTOL transition phase. The adaptive transition system compares ground speed 526 with scheduled ground speed 524 at one or more distances to target ground location 522, including, in some embodiments, multiple or all distances to target ground location 522. In the illustrated example, presented for purposes of clarifying the operation of the illustrative embodiments, the adaptive transition system compares ground speed 526 with scheduled ground speed 524 when tiltrotor aircraft 500 is in position 500c at distance 500d from target ground location 522. At distance 500d, the adaptive transition system determines ground speed error 530 and adjusts the conversion rate of tiltrotor aircraft 500 in proportion to ground speed error 530. More particularly, the adaptive transition system decreases the conversion rate of tiltrotor aircraft 500 from forward flight mode 500a to VTOL flight mode 500b in proportion to ground speed error 530 in response to scheduled ground speed 524 exceeding ground speed 526 such that tiltrotor aircraft 500 is vertically aligned with target ground location 522 in VTOL orientation 500b of the forward flight-to-VTOL transition phase and also has a zero ground speed over target ground location 522. Tiltrotor aircraft 500 may then perform any desired operation over target ground location 522 such as vertically landing on target ground location 522 and/or dropping a payload on target ground location 522.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A tailsitter aircraft comprising:
   an airframe;
   a thrust array attached to the airframe, the thrust array including a plurality of propulsion assemblies configured to transition the airframe from a forward flight orientation having a horizontal attitude for wing-borne lift to a vertical takeoff and landing (VTOL) orientation having a vertical attitude for thrust-borne lift at a conversion rate for an approach to a target ground location in a forward flight-to-VTOL transition phase; and
   a flight control system configured to independently control each of the propulsion assemblies, the flight control system implementing an adaptive transition system comprising:
   a transition parameter monitoring module configured to monitor a plurality of parameters associated with the transition from the forward flight orientation to the VTOL orientation; and
   a transition adjustment determination module configured to adjust the conversion rate of the airframe from the forward flight orientation to the VTOL orientation based on at least some of the parameters of the plurality of parameters monitored by the transition parameter monitoring module such that the airframe is substantially vertically aligned with the target ground location in the VTOL orientation of the forward flight-to-VTOL transition phase;
   wherein, the parameters used by the transition adjustment determination module to adjust the conversion rate of the airframe consist of a ground speed and a distance to the target ground location.

2. The tailsitter aircraft as recited in claim 1 wherein the flight control system comprises a predetermined transition schedule including a scheduled conversion rate and a scheduled ground speed for the airframe at a plurality of distances to the target ground location in the forward flight-to-VTOL transition phase; and wherein, the transition adjustment determination module is configured to compare the ground speed of the airframe with the scheduled ground speed at the plurality of distances to the target ground location.

3. The tailsitter aircraft as recited in claim 2 wherein the transition adjustment determination module is configured to compare the ground speed of the airframe with the scheduled ground speed at the plurality of distances to the target ground location to determine a ground speed error at each of the plurality of distances to the target ground location.

4. The tailsitter aircraft as recited in claim 3 wherein the transition adjustment determination module is configured to adjust the conversion rate of the airframe from the forward flight orientation to the VTOL orientation in proportion to the ground speed error.

5. The tailsitter aircraft as recited in claim 2 wherein the transition adjustment determination module is configured to increase the conversion rate of the airframe from the forward flight orientation to the VTOL orientation in response to the ground speed exceeding the scheduled ground speed.

6. The tailsitter aircraft as recited in claim 2 wherein the transition adjustment determination module is configured to decrease the conversion rate of the airframe from the forward flight orientation to the VTOL orientation in response to the scheduled ground speed exceeding the ground speed.

7. The tailsitter aircraft as recited in claim 2 wherein the predetermined transition schedule comprises a fixed predetermined transition schedule including a fixed scheduled conversion rate throughout the forward flight-to-VTOL transition phase.

8. The tailsitter aircraft as recited in claim 1 wherein the transition adjustment determination module is configured to adjust the conversion rate of the airframe from the forward flight orientation to the VTOL orientation such that the ground speed is zero when the airframe is substantially vertically aligned with the target ground location in the VTOL orientation of the forward flight-to-VTOL transition phase.

9. The tailsitter aircraft as recited in claim 1 further comprising a positioning module including a global positioning satellite module configured to detect a position of the airframe;

wherein, the transition parameter monitoring module determines the ground speed and the distance to the target ground location based at least partially on the position of the airframe detected by the positioning module.

10. A method for managing a transition of a tailsitter aircraft from a forward flight orientation having a horizontal attitude to a vertical takeoff and landing (VTOL) orientation having a vertical attitude at a conversion rate for an approach to a target ground location in a forward flight-to-VTOL transition phase, the method comprising:

monitoring a plurality of parameters associated with the transition from the forward flight orientation to the VTOL orientation; and adjusting the conversion rate of the tailsitter aircraft in the forward flight-to-VTOL transition phase based on at least some of the parameters of the plurality of parameters such that the tailsitter aircraft is substantially vertically aligned with the target ground location in the VTOL orientation of the forward flight-to-VTOL transition phase;

wherein, the parameters used to adjust the conversion rate of the tailsitter aircraft consist of a ground speed and a distance to the target ground location.

11. The method as recited in claim 10 further comprising comparing the ground speed of the tailsitter aircraft to a scheduled ground speed at a plurality of distances to the target ground location in the forward flight-to-VTOL transition phase.

12. The method as recited in claim 11 further comprises determining a ground speed error based on comparing in the ground speed of the tailsitter aircraft and the scheduled ground speed at the plurality of distances to the target ground location in the forward flight-to-VTOL transition phase.

13. The method as recited in claim 12 wherein adjusting the conversion rate of the tailsitter aircraft in the forward flight-to-VTOL transition phase further comprises modifying the conversion rate of the tailsitter aircraft in the forward flight-to-VTOL transition phase in proportion to the ground speed error.

14. The method as recited in claim 10 wherein adjusting the conversion rate of the tailsitter aircraft in the forward flight-to-VTOL transition phase further comprises increasing the conversion rate of the tailsitter aircraft from the forward flight orientation to the VTOL orientation in response to the ground speed exceeding a scheduled ground speed.

15. The method as recited in claim 10 wherein adjusting the conversion rate of the tailsitter aircraft in the forward flight-to-VTOL transition phase further comprises decreasing the conversion rate of the tailsitter aircraft from the forward flight orientation to the VTOL orientation in response to a scheduled ground speed exceeding the ground speed.

16. The method as recited in claim 10 wherein adjusting the conversion rate of the tailsitter aircraft in the forward flight-to-VTOL transition phase further comprises increasing the conversion rate of the tailsitter aircraft from the forward flight orientation to the VTOL orientation in response to the tailsitter aircraft experiencing a tail wind; and wherein, adjusting the conversion rate of the tailsitter aircraft in the forward flight-to-VTOL transition phase further comprises decreasing the conversion rate of the tailsitter aircraft from the forward flight orientation to the VTOL orientation in response to the tailsitter aircraft experiencing a head wind.

17. The method as recited in claim 10 further comprising receiving the target ground location from a remote system.

18. The method as recited in claim 10 further comprising limiting the conversion rate of the tailsitter aircraft in the forward flight-to-VTOL transition phase from exceeding an upper conversion rate threshold.

* * * * *